(12) United States Patent
Young

(10) Patent No.: US 12,247,115 B2
(45) Date of Patent: Mar. 11, 2025

(54) POLYMER COMPOSITIONS WITH IMPROVED WEATHERING RESISTANCE

(71) Applicant: Eastman Chemical Company, Kingsport, TN (US)

(72) Inventor: Robert Erik Young, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 159 days.

(21) Appl. No.: 17/310,055

(22) PCT Filed: Jan. 14, 2020

(86) PCT No.: PCT/US2020/013468
§ 371 (c)(1),
(2) Date: Jul. 14, 2021

(87) PCT Pub. No.: WO2020/150209
PCT Pub. Date: Jul. 23, 2020

(65) Prior Publication Data
US 2022/0049069 A1 Feb. 17, 2022

Related U.S. Application Data

(60) Provisional application No. 62/793,946, filed on Jan. 18, 2019.

(51) Int. Cl.
*C08K 5/34* (2006.01)
*C08G 63/199* (2006.01)
(Continued)

(52) U.S. Cl.
CPC ........ *C08K 5/34926* (2013.01); *C08G 63/199* (2013.01); *C08K 5/13* (2013.01); *C08K 5/524* (2013.01); *C08K 2201/014* (2013.01)

(58) Field of Classification Search
CPC ...... C08K 5/34926; C08K 5/13; C08K 5/524; C08G 63/199
See application file for complete search history.

(56) References Cited

U.S. PATENT DOCUMENTS 2,012,267 A    8/1935  Carothers
4,524,165 A *  6/1985  Musser ............... C08K 5/3462
                                                    525/437
(Continued)

FOREIGN PATENT DOCUMENTS

CN    105 524 399 A    4/2016
CN    106 317 798 A    1/2017
(Continued)

OTHER PUBLICATIONS

ASTMD1003; "Standard Test Method for Haze and Luminous Transmittance of Transparent Plastics"; Published Jun. 2021.
(Continued)

*Primary Examiner* — John E Uselding
(74) *Attorney, Agent, or Firm* — Robert C. Morriss

(57) ABSTRACT

This invention relates to a polymer composition comprising:
(A) at least one polyester, and
(B) a stabilizer composition comprising:
(1) at least one primary antioxidant comprising at least one hindered phenolic antioxidant;
(2) at least one secondary antioxidant comprising at least one phosphite;
(3) at least one chain extending agent;
(4) at least one ultraviolet light absorbing agent; and
(5) at least one hindered amine light stabilizer.

19 Claims, 6 Drawing Sheets

(51) Int. Cl.
*C08K 5/13* (2006.01)
*C08K 5/3492* (2006.01)
*C08K 5/524* (2006.01)

(56) References Cited

U.S. PATENT DOCUMENTS

| | | |
|---|---|---|
| 4,885,119 A | 12/1989 | Mueller et al. |
| 4,897,453 A | 1/1990 | Flora et al. |
| 5,428,086 A | 6/1995 | Minnick et al. |
| 5,654,347 A | 8/1997 | Khemani et al. |
| 5,696,176 A | 12/1997 | Khemani et al. |
| 6,984,694 B2 | 1/2006 | Blasius, Jr. et al. |
| 11,492,484 B2 | 11/2022 | Young et al. |
| 11,629,224 B2 | 4/2023 | Young et al. |
| 2001/0044518 A1 | 11/2001 | Hoffmann et al. |
| 2004/0010092 A1 | 1/2004 | Watanabe |
| 2004/0138381 A1* | 7/2004 | Blasius, Jr. ............. C08L 63/10 525/131 |
| 2004/0180997 A1* | 9/2004 | Pearson ................. C08L 69/00 524/99 |
| 2005/0043483 A1 | 2/2005 | Kim et al. |
| 2005/0124779 A1 | 6/2005 | Shelby et al. |
| 2007/0105993 A1 | 5/2007 | Germroth et al. |
| 2007/0213458 A1 | 9/2007 | Topoulos |
| 2009/0088504 A1 | 4/2009 | Chatterjee et al. |
| 2009/0170985 A1 | 7/2009 | Ai et al. |
| 2012/0083572 A1 | 4/2012 | Klots et al. |
| 2014/0128504 A1 | 5/2014 | Lu |
| 2014/0167088 A1 | 6/2014 | Lu |
| 2016/0130422 A1 | 5/2016 | Tamura et al. |
| 2016/0137834 A1 | 5/2016 | Sohn et al. |
| 2016/0264778 A1 | 9/2016 | Masunaga et al. |

FOREIGN PATENT DOCUMENTS

| | | | |
|---|---|---|---|
| CN | 107746554 A | 3/2018 | |
| EP | 3009476 A1 | 4/2016 | |
| WO | WO 2009/110230 A1 | 9/2009 | |
| WO | WO-2009120211 A1 * | 10/2009 | ............ C08F 220/32 |

OTHER PUBLICATIONS

ASTM D2244; "Standard Practice for Calculation of Color Tolerances and Color Differences from Instrumentally Measured Color Coordinates"; Published Jun. 2021.
ASTM D2457; "Standard Test Method for Specular Gloss of Plastic Films and Solid Plastics"; Published Jun. 2021.
ASTM D3418; "Standard Test Method for Transition Temperatures and Enthalpies of Fusion and Crystallization of Polymers by Differential Scanning Calorimetry"; Published Jun. 2015.
ASTM D3763; "Standard Test Method for High Speed Puncture Properties of Plastics Using Load and Displacement Sensors"; Published Nov. 2018.
ASTM D4440; "Standard Test Method for Plastics: Dynamic Mechanical Properties Melt Rheology"; Jan. 15, 2015.
ASTM D6290; "Standard Test Method for Color Determination of Plastic Pellets"; Published Jun. 2019.
ASTM D6395; "Standard Test Method for Flatwise Flexural Impact Resistance of Rigid Plastics"; Published Apr. 2011.
ASTM E308; "Standard Practice for Computing the Colors of Objects by Using the CIE System"; Published Sep. 2018.
ASTM G155; "Standard Practice for Operating Xenon Arc Light Apparatus for Exposure of Non Metallic Materials"; Published Aug. 2013.
Notification of Transmittal of The International Search Report and The Written Opinion of the International Searching Authority, or the Declaration with a Date of Mailing of Apr. 22, 2020 for International Application No. PCT/US2020/013468.
Elias, Hans-Georg; Macromolecules 1, Plenum Press: NY, 1977, p. 391.
Co-pending U.S. Appl. No. 16/631,873, filed Jan. 17, 2020; Young et al.
Co-pending U.S. Appl. No. 16/631,881, filed Jan. 17, 2020; Young et al.
Notification of Transmittal of The International Search Report and The Written Opinion of The International Searching Authority, or the Declaration; International Application No. PCT/US2018/042388 with a filing date of Jul. 17, 2018.
Notification of Transmittal of The International Search Report and The Written Opinion of The International Searching Authority, or the Declaration; International Application No. PCT/US2018/042395 with a filing date of Jul. 17, 2018.
USPTO Office Action dated May 7, 2021 received in co-pending U.S. Appl. No. 16/631,873.
USPTO Office Action dated Nov. 18, 2021 received in co-pending U.S. Appl. No. 16/631,873.
Notice of Allowance dated Jul. 7, 2022 received in co-pending U.S. Appl. No. 16/631/873.
USPTO Office Action dated Nov. 17, 2021 received in co-pending U.S. Appl. No. 16/631,881.
USPTO Office Action dated Apr. 29, 2022 received in co-pending U.S. Appl. No. 16/631,881.
Notice of Allowance dated Dec. 6, 2022 received in co-pending U.S. Appl. No. 16/631,881.

* cited by examiner

POLYMER COMPOSITIONS WITH IMPROVED WEATHERING RESISTANCE

CROSS-REFERENCE TO RELATED APPLICATION(S)

This application is a national stage filing under 35 USC § 371 of International Application Number PCT/US2020/013468, filed on, Jan. 14, 2020 which claims the benefit of the filing date to U.S. Provisional Application No. 62/793,946, filed on Jan. 18, 2019, the entire disclosures of which are incorporated by reference herein.

FIELD OF THE INVENTION

This invention relates to polymer compositions with improved weathering properties, impact strength properties, color properties, or combinations thereof.

BACKGROUND OF THE INVENTION

Polyesters and other polymeric materials degrade during processing and usage due to exposures such as heat, processing time, storage time, ultraviolet light, or other potential conditions.

A need has existed for polyesters and other polymeric material with improved weathering characteristics and resistance to ultraviolet radiation. Two strategies for imparting improved weathering resistance are typically utilized. An ultraviolet (UV) light absorbing caplayer or bulk loading additives into the polymer. A UV absorbing caplayer is most effective in sheet products or flat articles with concentrated UV absorbers which can be coextruded onto the weathered face. Bulk loading UV absorbers into a polymer is another method but its disadvantage can be prohibitively high loadings of UV absorbers which can lead to high cost and increased color/yellowness due to the color of the UV absorbers. Methods of improving color retention can also lead to rapid embrittlement of the polymer and loss of impact strength.

SUMMARY OF THE INVENTION

In view of the above commercial shortcomings in the art, the present disclosure addresses the need for novel polymeric compositions, polyesters or copolyesters, with at least one of the following desirable properties including but not limited to improved weathering properties, improved color, improved impact strength, and/or combinations of two or more of these properties. The polymeric compositions of this invention can provide desirable properties for a variety of applications.

The invention is as set forth in the Field of the Invention, the Summary of the Invention, the Description, the Examples, the appended Claims, and the Abstract.

For the ease of reference but not intending to be limiting in any way, certain aspects of this disclosure are numbered consecutively, as follows:

In aspect 1, there is provided a polymer composition comprising:
 (A) at least one thermoplastic polymer, and
 (B) a stabilizer composition comprising:
  (1) at least one primary antioxidant;
  (2) at least one secondary antioxidant;
  (3) at least one chain extending agent;
  (4) at least one ultraviolet light absorbing agent; and
  (5) at least one hindered amine light stabilizer (HALS).

In aspect 2, there is provided a polymer composition of aspect 1 wherein at least thermoplastic polymer comprises at least one condensation polymer.

In aspect 3, there is provided a polymer composition of aspect 1 comprising at least one polymer selected from liquid crystalline polyesters/amides/imides, polyesteramides, polyimides, polyetherimides, polyurethanes, polyureas, polybenzimidazole, polybenzoxazoles, polyimines, polycarbonates, polyesters, copolyesters, and polyamides.

In aspect 4, there is provided a polymer composition of aspect 3 comprising at least one polymer selected from thermoplastic polymers, condensation polymers, polyesters, amorphous polyesters, semi-crystalline polyesters, polyamides, or any of the foregoing polymers, comprising residues of cyclohexanedimethanol (e.g., 1,4-cyclohexanedimethanol).

In aspect 5, there is provided a polymer composition of aspect 4 comprising at least one polymer selected from polyesters (including but not limited to polyesterethers), polyamides, and comprising residues of cyclohexanedimethanol (e.g., 1,4-cyclohexanedimethanol) and/or residues of ethylene glycol residues.

In aspect 6 there is provided a polymer composition of aspect 1 comprising at least one polyester or copolyester.

In aspect 7, there is provided a polymer composition of aspect 6 comprising at least one polyester comprising cyclohexanedimethanol, e.g. 1,4-cyclohexanedimethanol and/or ethylene glycol residues In aspect 8, there is provided a polyester of aspect 7 comprising residues of terephthalic acid or terephthalic anhydride in the amount of 70 to 100 mole % based on a total diacid residues of 100 mole %.

In aspect 9, there is provided a polyester of aspects 7 or 8 comprising residues of isophthalic acid or isophthalic anhydride in the amount of 0 to 30 mole % based on a total diacid residues of 100 mole %.

In aspect 10, there is provided a polyester of aspect 9 comprising residues of isophthalic acid or isophthalic anhydride in the amount of about 0.01 to 30 mole % based on a total diacid residues of 100 mole %.

In aspect 11, there is provided a polymer composition of any one of aspects 6-10 wherein the diol residues comprise from about 20 to about 45 mole % 2,2,4,4-tetramethyl-1,3-cyclobutanediol residues, from about 55 to about 80 mole % of 1,4-cyclohexanedimethanol residues, and from about 0 to about 100 mole % of ethylene glycol residues, based on a total of diol residues of 100 mole %. In this aspect, there is also provided a polymer composition of any one of aspects 6-10 wherein the diol residues comprise from about 20 to about 30 mole % 2,2,4,4-tetramethyl-1,3-cyclobutanediol residues, from about 70 to about 80 mole % of 1,4-cyclohexanedimethanol residues, and from about 0 to about 100 mole % of ethylene glycol residues, based on a total of diol residues of 100 mole %.

In aspect 12, there is provided a polymer composition of any one of aspects 6-10 wherein the diol residues comprise from about 20 to 80 mole % ethylene glycol residues and from about 20 to about 80 mole % of 1,4-cyclohexanedimethanol residues.

In aspect 13, there is provided a polymer composition of any one of aspects 6-10 wherein the diol residues comprise from about 0 to 20 mole % ethylene glycol residues and from about 80 to about 100 mole % of 1,4-cyclohexanedimethanol residues.

In aspect 14, there is provided a polymer composition of any one of aspects 6-10 wherein the diol residues comprise from about 20 to about 60 mole % ethylene glycol residues and from about 40 to about 80 mole % of 1,4-cyclohexanedimethanol residues.

In aspect 15, there is provided a polymer composition of any one of aspects 6-10 wherein the diol residues comprise from about 60 to about 80 mole % ethylene glycol residues and from about 20 to about 40 mole % of 1,4-cyclohexanedimethanol residues.

In aspect 16, there is provided a polymer composition of any one of aspects 6-10 wherein the diol residues comprise from about 80 to about 99.99 mole % ethylene glycol residues and from about 0.01 to about 20 mole % of 1,4-cyclohexanedimethanol residues.

In aspect 17, there is provided a polymer composition of any one of aspects 6-10 comprising 2,2,4,4-tetramethyl-1,3-cyclobutanediol residues.

In aspect 18, there is provided a polymer composition of aspect 17 wherein the diol residues comprise from about 10 to 45 mole % 2,2,4,4-tetramethyl-1,3-cyclobutanediol residues, from 55 to about 90 mole % of ethylene glycol residues, and from 0 to 100 mole % of 1,4-cyclohexanedimethanol residues.

In aspect 19, there is provided a polymer composition of aspect 18 wherein the diol residues comprise from about 15 to 30 mole % 2,2,4,4-tetramethyl-1,3-cyclobutanediol residues, from 55 to about 90 mole % of ethylene glycol residues, and from 0 to 100 mole % of 1,4-cyclohexanedimethanol residues.

In aspect 20, there is provided a polymer composition of any one of aspects 1-19 comprising residues of at least one branching agent.

In aspect 21, there is provided a polymer composition of any of aspects 1-20 comprising 0.01 to 5 weight % of residues of a branching agent, based on a total of 100 mole % acid residues and a total of 100 mole % diol residues.

In aspect 22, there is provided a polymer composition of any one of aspects 1-21 comprising at least one branching agent selected from trimellitic acid, trimellitic anhydride, trimesic acid, trimethyol ethane, trimethyolpropane, pentaerythritol, glycerine, tetra-maleic anhydride, and trimer acid.

In aspect 23, there is provided a polymer composition of any one of aspects 1-22, wherein the polymer composition has an inherent viscosity in the range from 0.35 to 1.5 dL/g, as determined in 60/40 (wt/wt) phenol/tetrachloroethane at a concentration of 0.5 g/100 ml at 25° C.

In aspect 24, there is provided a polymer composition of any of aspects 1 to 7, wherein the polymer is at least one copolyesterether.

In aspect 25, there is provided a polymer composition of aspect 24, wherein the dicarboxylic acid or ester thereof component comprises residues of 1,4-cyclohexanedicarboxylic acid or an ester thereof, and wherein the diol component comprises residues of 1,4-cyclohexanedimethanol and polytetramethylene ether glycol, wherein the total diol residues equal 100 mole % and the total acid residues equal 100 mole %.

In aspect 26, there is provided a polymer composition of aspect 25, wherein the inherent viscosity is from about 0.7 to about 1.5 dL/g, as determined in 60/40 (wt/wt) phenol/tetrachloroethane at a concentration of 0.5 g/100 ml at 25° C.

In aspect 27, there is provided a polymer composition of aspects 25 or 26, comprising from about 15 to about 50 weight %, or from 20 to 35 weight %, based on the weight of the polyesterether, of polytetramethyleneether glycol having a weight molecular weight of about 500 to about 2000.

In aspect 28, there is provided a polymer composition of any one of aspects 1-27 wherein the phenolic antioxidant is present in an amount from 0.10 to 5.0, or from 0.10 to 4.0, or from 0.10 to 3.0, or from 0.10 to 2.0 weight % based on the total weight % of the polymer composition equaling 100 weight %.

In aspect 29, there is provided a polymer composition of any one of aspects 1-28 wherein the phenolic antioxidant can be selected from hydroquinone, arylamine antioxidants such as 4,4'-bis(α,α-dimethylbenzyl)diphenylamine, hindered phenol antioxidants such as 2,6-di-tert-butyl-4-methylphenol, butylated p-phenyl-phenol and 2-(α-methylcyclohexyl)-4,6-dimethylphenol; bis-phenols such as 2,2'-methylenebis-(6-tert-butyl-4-methylphenol), 4,4'bis(2,6-di-tert-butylphenol), 4,4'-methylenebis(6-tert-butyl-2-methylphenol), 4,4'-butylene-bis(6-tert-butyl-3-methylphenol), methylenebis(2,6-di-tertbutylphenol), 4,4'-thiobis(6-tert-butyl-2-methylphenol), and 2,2'-thiobis(4-methyl-6-tert-butylphenol); tris-phenols such as 1,3,5-tris(3,5-di-tert-butyl-4-hydroxyhydrocinnamoyl)-hexahydro-s-triazine, 1,3,5-trimethyl-2,4,6-tris(3,5-di-tert-butyl-4-hydroxybenzyl)benzene and tri(3,5-di-tert-butyl-4-hydroxyphenyl)phosphite; and pentaerythritol tetrakis[3-(3,5-di-t-butyl-4-hydroxyphenyl)propionate] the last of which is commercially available as Irganox™ 1010 antioxidant; or combinations thereof.

In aspect 30, there is provided a polymer composition of any one of aspects 1-29 wherein at least one hindered phenolic antioxidant is pentaerythritol tetrakis[3-(3,5-di-t-butyl-4-hydroxyphenyl)propionate (Irganox 1010).

In aspect 31, there is provided a polymer composition of any one of aspects 1-30 wherein the phosphite antioxidant is present in an amount from 0.10 to 2.0 weight %, or from 0.10 to 1.5 weight %, or from 0.10 to 1.0 weight %, or from 0.10 to 0.50 weight %, based on the total weight of the polymer composition equaling 100 weight %.

In aspect 32, there is provided a polymer composition of any one of aspects 1-31 wherein the phosphite antioxidant is selected from at least one of tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; or combinations thereof.

In aspect 33, there is provided a polymer composition of any one of aspects 1-32 wherein the phosphite antioxidant is tris(2,4-di-tert-butylphenyl)phosphite.

In aspect 34, there is provided a polymer composition of any one of aspects 1-33 wherein the weight ratio of phenolic antioxidant (1) to phosphite antioxidant (2) is from 0.25 to 2.0, or from 0.25-1.75, or from 0.25 to 1.50, or from 0.50 to 2.0, or from 0.50-1.50, or from 0.75-1.25, or from 0.80-1.2, or from 0.80-1.5, or from 0.90-1.10, or from 0.90-1.10, or from 1:1.

In aspect 35, there is provided a polymer composition of any one of aspects 1-34 wherein at least one chain extending agent is present in an amount from 0.10 to 2.0 weight %, or from 0.10 to 1.50 weight %, or from 0.10 to 1.0 weight %, or from 0.25 to 0.75 weight %, based on the total weight percentage of the polymer composition equaling 100 weight %.

In aspect 36, there is provided a polymer composition of any one of aspects 1-35 wherein at least one chain extending agent has an average of greater than or equal to 4 pendant epoxy groups per molecule.

In aspect 37, there is provided a polymer composition according to any of claims 1-36 wherein at least one chain expending agent comprises copolymers of glycidyl methacrylate with alkenes and acrylic esters, copolymers of glycidyl methacrylate with alkenes and vinyl acetate, and/or copolymers of glycidyl methacrylate and styrene.

In aspect 38, there is provided a polymer composition of any one of aspects 1-37 wherein at least one chain extending agent comprises a copolymer of glycidyl methacrylate with styrene.

In aspect 39, there is provided a polymer composition of any one of aspects 1-38 wherein the weight ratio of chain extending agent to primary antioxidant is from 3:1 to 1:1 or 2:1.

In aspect 40, there is provided a polymer composition of any one of aspects 1-39 wherein the weight ratio of chain extending agent to total antioxidant (primary and secondary) is from is from 0.25 to 2.0, or from 0.25-1.75, or from 0.25 to 1.50, or from 0.50 to 2.0, or from 0.50-1.50, or from 0.75-1.25, or from 0.80-1.2, or from 0.80-1.5, or from 0.90-1.10, or from 0.90-1.10, or from 1:1.

In aspect 41, there is provided a polymer composition of any one of aspects 1-40 wherein at least one phenolic antioxidant is pentaerythritol tetrakis[3-(3,5-di-t-butyl-4-hydroxyphenyl)propionate, at least one phosphite is tris(2,4-di-tert-butylphenyl)phosphite, and at least one chain extending agent is a copolymer of glycidyl methacrylate with styrene.

In aspect 42, there is provided a polymer composition of any one of aspects 1-41 wherein at least one of the ultraviolet light absorbing agents is selected from triazines, cyanoacrylates, benzotriazoles, naphthalenes, benzophenones, and benzoxazine-4-ones, or combinations thereof.

In aspect 43, there is provided a polymer composition of any one of aspects 1-42 wherein at least one ultraviolet light absorbing agents is selected from triazines.

In aspect 44, there is provided a polymer composition of any one of aspects 1-43 is selected from the following: 2,4-cis(2,4-dimethylphenyl)-6-(2-hydroxy-4-isooctyloxyphenyl)-1,3,5-triazine (CAS #2725-22-62), known as Cyasorb 1164 commercially available from Solvay; 2,4,6-diphenyl-1,3,5-triazin-2-yl)-5-[(hexyl)oxy]-phenol] (CAS #147315-50-2), known as Tinuvin™ 1577 commercially available from BASF); or 6-[4,6-bis(4-phenylphenyl)-1H-1,3,5-triazin-2-ylidene]-3-(2-ethylhexoxy)cyclohexa-2,4-dien-1-one) (CAS #204583-39-1) known as Tinuvin™ 1600 commercially available from BASF, or mixtures thereof.

In aspect 45, there is provided a polymer composition of any one of aspects 1-44 wherein the total weight ratio of ultraviolet light absorbing agent to the total weight of primary and secondary antioxidant is from 10:0.25, or from 8.0:0.25, or from 6.0:0.25, or from 3.0:0.25, or from 10:0.25, or from 8.0:0.25, or from 6.0:0.25, or from 3.0:0.25, or from 10:0.50, or from 8.0:0.50, or from 6.0:0.50, or from 3.0:0.50, or from 10:0.50, or from 8.0:0.50, or from 6.0:0.50, or from 3.0:0.50.

In aspect 46, there is provided a polymer composition of any one of aspects 1-45 wherein the total weight ratio of ultraviolet light absorbing agent to chain extender is from 10:0.25, or from 8.0:0.25, or from 6.0:0.25, or from 3.0:0.25, or from 10:0.25, or from 8.0:0.25, or from 6.0:0.25, or from 3.0:0.25, or from 10:0.50, or from 8.0:0.50, or from 6.0:0.50, or from 3.0:0.50, or from 10:0.50, or from 8.0:0.50, or from 6.0:0.50, or from 3.0:0.50.

In aspect 47, there is provided a polymer composition of any of aspects 1-46 wherein the hindered amine light stabilizer comprises the following structure:

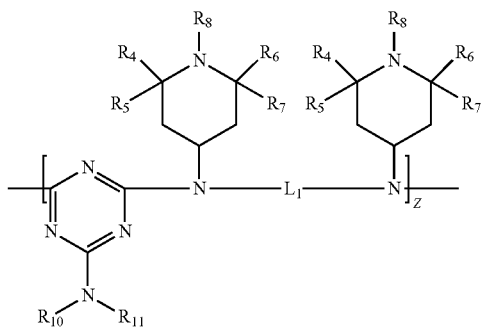

wherein $R_4=R_5=R_6=R_7=R_8$=methyl, $(R_{10})(R_{11})N$— collectively represent morpholino, $L_1$ is hexamethylene, and Z is 1 to 6.

In aspect 48, there is provided a polymer composition of any of aspects 1-47 wherein the hindered amine light stabilizer is selected from at least one of 1,6-hexanediamine N, N-bis(2,2,6,6-tetramethyl-4-piperidinyl)(CAS #565450-39-7, known as Tinuvin Nor™371-FF, commercially available from BASF; or polymers with morpholine-2,4,6-trichloro1,3,5-triazine (CAS #193098-40-7); known as Cyasorb™ 3529 commercially available from Solvay.

In aspect 49, there is provided a polymer composition of any of aspects 1-48 wherein the hindered amine light stabilizer is present in an amount from 0.10 weight % to 2.0 weight %, based on the total weight of the polymer composition.

In aspect 50, there is provided a polymer composition of any of aspects 1-49 wherein the weight ratio of ultraviolet light absorbing agent to the hindered amine light stabilizer is from 10:0.25, or from 8.0:0.25, or from 6.0:0.25, or from 3.0:0.25, or from 10:0.25, or from 8.0:0.25, or from 6.0:0.25, or from 3.0:0.25, or from 10:0.50, or from 8.0:0.50, or from 6.0:0.50, or from 3.0:0.50, or from 10:0.50, or from 8.0:0.50, or from 6.0:0.50, or from 3.0:0.50.

In aspect 51, there is provided a polymer composition of any of aspects 1-50 wherein: (1) at least one phenolic antioxidant is pentaerythritol tetrakis[3-(3,5-di-t-butyl-4-hydroxyphenyl)propionate; (2) at least one phosphite is tris(2, 4-di-tert-butylphenyl)phosphite; (3) at least one chain extending agent is a copolymer of glycidyl methacrylate with styrene; (4) at least one ultraviolet light absorbing agent is a triazine; and (5) at least one hindered amine light stabilizer is either 1,6-hexanediamine N, N-bis(2,2,6,6-tetramethyl-4-piperidinyl)(CAS #565450-39-7) or polymers with morpholine-2,4,6-trichloro1,3,5-triazine (CAS #193098-40-7); known as Cyasorb™ 3529 commercially available from Solvay, or mixtures thereof.

In aspect 52, there is provided a polymer composition of any one of aspects 1-51 wherein the polymer composition comprises: (1) at least one phenolic antioxidant in the amount of from 0.10 weight % to 2.0 weight %, (2) at least one phosphite in the amount of from 0.10 weight % to 2.0 weight %, (3) at least one chain extending agent in the amount of from 0.10 weight % to 2.0 weight %, (4) at least one ultraviolet light absorber in the amount of 0.10 to 3.0 weight %, and (5) at least one hindered amine light stabilizer in an amount from 0.10 weight % to 2.0 weight %, based on the total weight of the polymer composition.

In aspect 53, there is provided a polymer composition of any one of aspects 1-52 wherein the polymer composition the polymer composition comprises: (1) at least one phenolic antioxidant in the amount of from 0.10 weight % to 2.0 weight %, (2) at least one phosphite in the amount of from 0.10 weight % to 2.0 weight %, (3) at least one chain extending agent in the amount of from 0.10 weight % to 2.0 weight %, (4) at least one ultraviolet light absorber in the amount of from 0.10 to 3.0 weight %, and (5) at least one hindered amine light stabilizer in an amount from 0.10 weight % to 2.0 weight %, based on the total weight of the polymer composition.

In aspect 54, there is provided a polymer composition of any one of aspects 1-53 wherein the Δb* value for said polymer composition is less than 10, or less than 5, or less than 3, or less than 2, or less than 1, or from 10 to −10 or from 5 to −10, or from 3 to −10, or from 2 to −10, or from 1 to −10, according to the L*, a* and b* color system of the CIE (International Commission on Illumination), when exposed for from 1000 hours to 4000 hours to ASTM Test Method G155 in a xenon arc Atlas Ci4000 Weather-Ometer using an irradiation of 0.35 W/m² at 340 nm, inner and outer borosilicate filters, 55% relative humidity, a black panel temperature of 63° C., a chamber temperature of 52° C., and a cycle consisting of all light with 18 minutes of water spray for every 2 hours irradiation.

In aspect 55, there is provided a polymer composition of any one of aspects 1-54 wherein the Δb* value for said polymer composition is less than 2.

In aspect 56, there is provided a polymer composition of any one of aspects 1-55 wherein the ΔE* value for said polymer composition is less than 10, or less than 5, or less than 3, or less than 2, or less than 1, or from 0 to 10 or from 0 to 10, or 0 to 9, or 0 to 8.5, or 0 to 5, or 0 to 2.5, according to the L*, a* and b* color system of the CIE (International Commission on Illumination) after being exposed for at least 200 hours, or at least 600 hours to ASTM Test Method G155 in a xenon arc Atlas Ci4000 Weather-Ometer using an irradiation of 0.35 W/m² at 340 nm, inner and outer borosilicate filters, 55% relative humidity, a black panel temperature of 63° C., a chamber temperature of 52° C., and a cycle consisting of all light with 18 minutes of water spray for every 2 hours irradiation.

In aspect 57, there is provided a polymer composition of any one of aspects 1-56 wherein the ΔE* value for said polymer composition is less than 10.

In aspect 58, there is provided a polymer composition of any one of aspects 1-57 wherein the flatwise impact strength according to ASTM Method D6395 was 60 to 80 kJ/m² when exposed from 0 to 1600 hours.

In aspect 59, there is provided a polymer composition of any one of aspects 1-58 wherein the polymer composition comprise the invention relates to a method for stabilizing any of the thermoplastic polymers useful in the invention comprising the incorporation into a polymer an effective stabilizing amount of the stabilizer composition(s) of the invention.

For certain aspects of the invention, the polymer composition can have improved properties, for example, for color stability, weatherability, and/or impact strength, e.g., instrument impact strength or flatwise impact strength.

In certain aspects, the improvements observed were unpredictable and greater than would be expected from the sum of the individual effects of each additive on the polymer and/or greater than what would be expected from other combinations of additives, such as combinations of primary antioxidants, secondary antioxidants, chain extending agents without the ultraviolet light absorbing agent or stabilizer. polymer compositions with improved weathering properties, impact strength properties, color properties, or combinations thereof.

DETAILED DESCRIPTION

Figure 1:
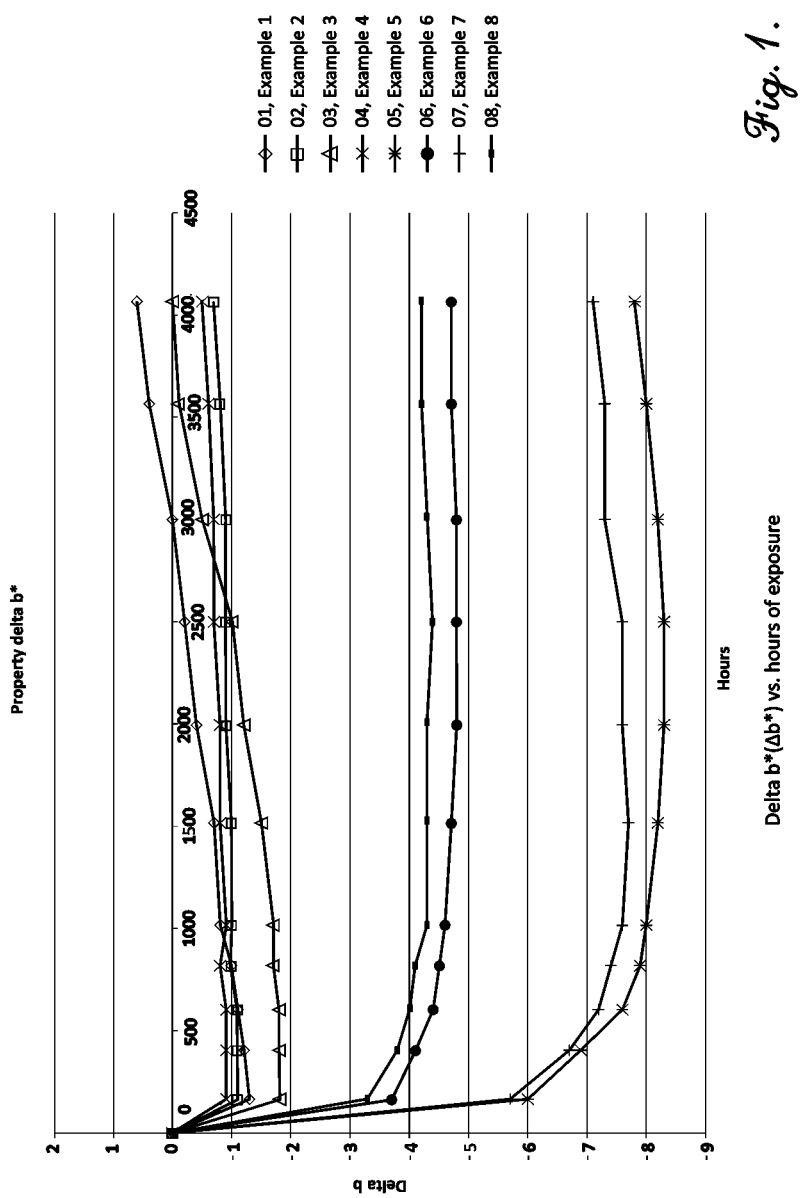
FIG. 1: The graph in FIG. 1 shows the effect on Δb* color at different levels of primary antioxidant (for example, Irganox™1010 antioxidant), secondary antioxidant (for example, Irgafos™ 168 antioxidant), chain extending agent (for example, Joncryl™4468 additive), ultraviolet light stabilizer (for example, (Cyasorb™1164 or Tinuvin™1600), and hindered amine light stabilizer (Cyasorb™ 3529), for Polyester 1 as described in Table 1.

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

The present invention involves the use of primary antioxidants, secondary antioxidants, UV absorbers, hindered amine light stabilizers, and chain extending additives in polymers which can improve the weathering and ultraviolet radiation resistance and inhibit the weathering, ultraviolet radiation, thermal oxidative and hydrolytic degradation of polymers, optionally held at elevated temperatures for extended periods of time.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons," is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As used in the specification and the claims, the singular forms "a," "an" and "the" include their plural references unless the context clearly dictates otherwise. References to a composition or process containing or including "an" ingredient or "a" step is intended to include other ingredients or other steps, respectively, in addition to the one named.

The terms "containing" or "including," are synonymous with the term "comprising," and is intended to mean that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

In each embodiment of the invention, the polymers useful in the invention can comprise condensation polymers. Condensation polymers useful in the invention can include but are not limited to, at least one of liquid crystalline polyesters/amides/imides, polyesteramides, polyimides, polyetherimides, polyurethanes, polyureas, polybenzimidazole, polybenzoxazoles, polyimines, polycarbonate, polyesters, copolyesters, polyamides (e.g., Nylon 6,6 or Nylon 6), or mixtures thereof. All of these polymers can be susceptible to thermal oxidative and hydrolytic degradation. Polycaprolactone, polycaprolactam, while not typically synthesized using condensation polymerization, are also susceptible to hydrolytic degradation and are included within the scope of this invention. Polyphenylene sulfide, polyphenylene oxide, poly ether ether ketone, poly ether ketone, poly ether ketone ketone, while not condensation polymers in the traditional sense, are highly susceptible to cross-linking and branching during melt processing and they are limited by thermal stability during processing and end use applications in the oil and gas industries and are included within the scope of this invention. The polymers useful in the polymer composition of the invention can be thermoplastic.

In one embodiment, the polymer composition useful in the invention comprises at least one polyester. In embodiments, polyesters useful in the present invention can comprise residues of at least one aromatic diacid and residues of at least one glycol. The term "copolyester," as used herein, is intended to include "polyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically, the difunctional carboxylic acid can be a dicarboxylic acid and the difunctional hydroxyl compound can be a dihydric alcohol such as, for example, glycols. Furthermore, as used in this application, the interchangeable terms "diacid" or "dicarboxylic acid" include multifunctional acids, such as branching agents. The term "glycol" as used in this application includes, but is not limited to, diols, glycols, and/or multifunctional hydroxyl compounds. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue," as used herein, means any organic structure incorporated into a polymer through a polycondensation and/or an esterification reaction from the corresponding monomer. The term "repeating unit," as used herein, means an organic structure having a dicarboxylic acid residue and a diol residue bonded through an ester group. Thus, for example, the dicarboxylic acid residues may be derived from a dicarboxylic acid monomer or its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester. The term "modifying aromatic diacid" means an aromatic dicarboxylic acid other the terephthalic acid. The term "modifying glycol" means a glycol other than 1,4-cyclohexanedimethanol. In one embodiment, terephthalic acid may be used as the starting material. In another embodiment, dimethyl terephthalate may be used as the starting material. In another embodiment, mixtures of terephthalic acid and dimethyl terephthalate may be used as the starting material and/or as an intermediate material. For the purposes of this invention, polyesterethers are included within the definition of polyesters within the scope of this invention.

The polyesters and copolyesters of the present invention are readily prepared by methods well known in the art, for example, as described in U.S. Pat. No. 2,012,267, incorporated herein by reference in its entirety. More particularly, the reactions for preparing the copolyesters are usually carried out at temperatures of about 150° C. to about 300° C. in the presence of polycondensation catalysts such as titanium tetrachloride, manganese diacetate, antimony oxide, dibutyl tin diacetate, zinc chloride, or combinations thereof. The catalysts are typically employed in amounts of 10 to 1000 ppm, based on total weight of the reactants.

In one embodiment, the polymer composition useful in the invention can contain at least one polymer comprising cyclohexanedimethanol, e.g. 1,4-cyclohexanedimethanol. In one embodiment, the polymer composition useful in the invention can contain at least one polymer comprising ethylene glycol residues.

Condensation polymers are also susceptible to hydrolytic degradation if not pre-dried or if they are held at elevated temperatures in moist air for a long period of time. Condensation polymers are any polymers where monomers reacting during polycondensation to create a polymer and a by-product such as water or methanol is produced. The polymerization reaction is reversible; thus, condensation polymers are often pre-dried before processing.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compounds) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 70 mole % terephthalic acid, based on the total acid residues, means the polyester contains 70 mole % terephthalic acid residues out of a total of 100 mole % acid residues. Thus, there are 70 moles of terephthalic acid residues among every 100 moles of acid residues. In another example, a polyester containing 30 mole % 1,4-cyclohexanedimethanol residues, based on the total diol residues, means the polyester contains 30 mole % 1,4-cyclohexanedimethanol residues out of a total of 100 mole % diol residues. Thus, there are 30 moles of 1,4-cyclohexanedimethanol residues among every 100 moles of diol residues.

In one embodiment, the polyester or copolyesters comprise compositions with a single diacid or combinations of diacids such as terephthalic acid or phthalic acid or other diacids with 8 to 20 carbon atoms, with combinations of modifying glycols such as cyclohexanedimethanol or ethylene glycol or other glycols with 2 to 20 carbon atoms.

In certain embodiments, the condensation polymer comprises at least one diol residue. In certain embodiments, the condensation polymer is a polyester comprising at least one dicarboxylic acid or an ester thereof and at least one diol, wherein the total of acid residues present is 100 mole % and wherein the total of diol residues is 100 mole %. In certain embodiments, the condensation polymer, e.g., polyester, comprises 1,4-cyclohexanedimethanol residues and/or 2,2,4,4-tetramethyl-1,3-cyclobutanediol residues and/or ethylene glycol residues, and/or diethylene glycol residues, or mixtures thereof.

In certain embodiments, terephthalic acid, or an ester thereof, such as, for example, dimethyl terephthalate, or a mixture of terephthalic acid and an ester thereof, makes up most or all of the dicarboxylic acid component used to form the polyesters useful in the invention. In certain embodiments, terephthalic acid residues can make up a portion or all of the dicarboxylic acid component used to form the present polyester at a concentration of at least 70 mole %, such as at least 80 mole %, at least 90 mole %, at least 95 mole %, at least 99 mole %, or 100 mole %. In certain embodiments, polyesters with high amounts of terephthalic acid can be used in order to produce higher impact strength properties. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acids and/or dimethyl terephthalate residues, the dicarboxylic acid component of the polyesters useful in the invention can comprise up to 50 mole %, up to 40 mole %, up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, from 0.01 to 20 mole %, from 0.01 to 10 mole %, from 0.01 to 5 mole %, or from 0.01 to 1 mole % of one or more modifying aromatic dicarboxylic acids. In one embodiment, modifying aromatic dicarboxylic acids that may be used in the present invention include, but are not limited to, those having up to 20 carbon atoms. Examples of modifying aromatic dicarboxylic acids which may be used in this invention include, but are not limited to, isophthalic acid, 4,4-biphenyldicarboxylic acid, 1,4-, 1,5-, 2,6-, 2,7-naphthalenedicarboxylic acid, and trans-4,4-stilbenedicarboxylic acid, and esters thereof. In one embodiment, isophthalic acid is the modifying aromatic dicarboxylic acid. In one embodiment, dimethyl isophthalate is used. In one embodiment, dimethyl naphthalate is used.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, malonic, succinic, glutaric, adipic, pimelic, suberic, azelaic and dodecanedioic dicarboxylic acids or their corresponding esters including but not limited to dimethyl adipate, dimethyl glutarate and dimethyl succinate. Certain embodiments can also comprise 0.01 or more mole %, such as 0.1 or more mole %, 1 or more mole %, 5 or more mole %, or 10 or more mole % of one or more modifying aliphatic dicarboxylic acids. Yet another embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

In one embodiment, only esters of terephthalic acid and esters of the other modifying dicarboxylic acids may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, and phenyl esters.

In one embodiment of the invention, the polyesters useful in the invention can contain less than 30 mole % of one or more modifying glycols. In another embodiment, the polyesters useful in the invention can contain 20 mole % or less of one or more modifying glycols. In another embodiment, the polyesters useful in the invention can contain 10 mole % or less of one or more modifying glycols. In another embodiment, the polyesters useful in the invention can contain 5 mole % or less of one or more modifying glycols.

In another embodiment, the polyesters useful in the invention may contain 0 mole % modifying glycols. Certain embodiments can also contain 0.01 or more mole %, such as 0.1 or more mole %, 1 or more mole % of one or more modifying glycols. Thus, if present, it is contemplated that the amount of one or more modifying glycols can range from any of these preceding endpoint values including, for example, from 0.01 to 15 mole % and from 0.1 to 10 mole %.

Modifying glycols useful in the polyesters useful in the invention can contain 2 to 16 carbon atoms. For TMCD-CHDM copolyesters (polymers comprising 2,2,4,4-tetramethyl-1,3-cyclobutanediol, 1,4-cyclohexanedimethanol, and terephthalic acid residues), a modifying glycol can be residues of ethylene glycol. For TMCD-EG copolyesters (polymers comprising 2,2,4,4-tetramethyl-1,3-cyclobutanediol, ethylene glycol, and terephthalic acid residues), a modifying glycol can be residues of 1,4-cyclohexanedimethanol. Examples of other suitable modifying glycols useful in the polyesters described herein include, but are not limited glycols selected from ethylene glycol, diethylene glycol, triethylene glycol, isosorbide, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methyl-pentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane, 2,2-bis-(4-hydroxypropoxyphenyl)-propane, and mixtures thereof.

In one TMCD copolyester embodiment, ethylene glycol residues can be excluded as a modifying diol. For modified PETG and modified PCTG polymers, the modifying glycol can be a glycol other than ethylene glycol residues and 1,4-cyclohexanedimethanol residues, for example. In one TMCD copolyester embodiment, 2,2,4,4-tetramethyl-1,3-cyclobutanediol (TMCD) residues can be present and/or ethylene glycol (EG) residues and/or 1,4-cyclohexanedimethanol residues (CHDM) can be present where other diols are modifying diols. For example, for TMCD-EG polyesters, one modifying glycol can be 1,4-cyclohexanedimethanol (CHDM). For example, for TMCD-CHDM polyesters, one modifying glycol could be ethylene glycol.

Other modifying glycols can include polymeric diols (also known as polyols) such as: polyethylene glycol, polypropylene glycol, PTMG (also called PTMEG or polyTHF), polyester polyol, polycarbonate polyol, and polycaprolactone polyol. A polyol is an organic compound containing multiple hydroxyl groups. A molecule with more than two hydroxyl groups is a polyol, with three is a triol, one with four is a tetrol and so on. By convention, polyols do not refer to compounds that contain other functional groups. Polyols typically have weight average molecular weights (Mw) of about 500 to 5000 with Mw's of about around 1000 to 2000 preferred. In embodiments, hydroxyl functionalities, meaning the number of hydroxyl groups as polymer end groups, can range from about 1.9 to about 2.1 for thermoplastic materials and from about 2.1 and higher for crosslinked materials.

The polyesters useful in the polyester compositions and/or the polyesterethers of the invention can comprise from 0 to 10 mole % of at least one branching agent, for example, 0.01 to 5 mole % or 0.01 to 4 mole % or from 0.01 to 3 mole % or from 0.01 to 2 mole % or 0.01 to about 1.5 mole % or from 0.01 to 1 mole % or from 0.1 to 5 mole % or 0.1 to 4 mole % or from 0.1 to 3 mole % or from 0.1 to 2 mole % or from 0.1 to about 1.5 mole % or from 0.1 to 1 mole or from 0.5 to 5 mole % or 0.5 to 4 mole % or from 0.5 to 3 mole % or from 0.5 to 2 mole % or from 0.5 to about 1.5 mole % or from 0.5 to 1 mole % or from 1 to 5 mole % or 1 to 4 mole % or from 1 to 3 mole % or from 1 to 2 mole % or from 0.1 to 0.7 mole %, or 0.1 to 0.5 mole %, based the total mole percentages of either the diol or diacid residues, based on at total of 100 mole % diols and 100 mole % diacids; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the invention can thus be linear or branched.

Examples of branching monomers include, but are not limited to, multifunctional acids or multifunctional alcohols such as trimellitic acid, trimellitic anhydride, pyromellitic dianhydride, trimethylolpropane, trimethylolethane, glycerol, pentaerythritol, citric acid, tartaric acid, 3-hydroxyglutaric acid, pentaerythritol, sorbitol, 1,2,6-hexanetriol, glycerine tetra-maleaic anhydride, and trimesic acid, and the like or mixtures thereof.

In one embodiment, at least one of trimellitic acid, trimellitic anhydride, trimesic acid, pentaerythritol, glycerine, tetra-maleaic anhydride, and trimer acid can be used as the branching agent. The branching monomer may be added to the polyester reaction mixture or blended with the polyester in the form of a concentrate as described, for example, in U.S. Pat. Nos. 5,654,347 and 5,696,176.

The polymers and/or polyesters useful in the invention can comprise residues of 1,4-cyclohexanedimethanol in any amount, included but not limited to at least one of the following amounts: from 0.01 to 100 mole %; from 0.01 to 100 mole %; from 0.01 to 99.99 mole %; from 0.10 to 99 mole %; from 0.10 to 99 mole %; from 0.10 to 95 mole %; from 0.10 to 90 mole %; from 0.10 to 85 mole %; from 0.10 to 80 mole %; from 0.10 to 70 mole %; from 0.10 to 60 mole %; from 0.10 to 50 mole %; from 0.10 to 40 mole %; from 0.10 to 35 mole %; from 0.10 to 30 mole %; from 0.10 to 25 mole %; from 0.10 to 20 mole %; from 0.10 to 15 mole %; from 0.10 to 10 mole %; from 0.10 to 5 mole %; from 1 to 100 mole %; from 1 to 99 mole %; 1 to 95 mole %; from 1 to 90 mole %; from 1 to 85 mole %; from 1 to 80 mole %; from 1 to 70 mole %; from 1 to 60 mole %; from 1 to 50 mole %; from 1 to 40 mole %; from 1 to 35 mole %; from 1 to 30 mole %; from 1 to 25 mole %; from 1 to 20 mole %; from 1 to 15 mole %; from 1 to 10 mole %; from 1 to 5 mole %; 5 to 100 mole %; 5 to 99 mole %; 5 to 95 mole %; from 5 to 90 mole %; from 5 to 85 mole %; from 5 to 80 mole %; 5 to 70 mole %; from 5 to 60 mole %; from 5 to 50 mole %; from 5 to 40 mole %; from 5 to 35 mole %; from 5 to 30 mole %; from 5 to 25 mole %; from 5 to 20 mole %; and from 5 to 15 mole %; from 5 to 10 mole %; from 10 to 100 mole %; from 10 to 99 mole %; 10 to 95 mole %; from 10 to 90 mole %; from 10 to 85 mole %; from 10 to 80 mole %; from 10 to 70 mole %; from 10 to 60 mole %; from 10 to 50 mole %; from 10 to 40 mole %; from 10 to 35 mole %; from 10 to 30 mole %; from 10 to 25 mole %; from 10 to 20 mole %; from 10 to 15 mole %; from 20 to 100 mole %; from 20 to 99 mole %; 20 to 95 mole %; from 20 to 90 mole %; from 20 to 85 mole %; from 20 to 80 mole %; from 20 to 70 mole %; from 20 to 60 mole %; from 20 to 50 mole %; from 20 to 40 mole %; from 20 to 35 mole %; from 20 to 30 mole %; and from 20 to 25 mole %; 30 to 100 mole %; from 30 to 99 mole %; 30 to 95 mole %; from 30 to 90 mole %; from 30 to 85 mole %; from 30 to 80 mole %; from 30 to 70 mole %; from 30 to 60 mole %; from 30 to 50 mole %; from 30 to 40 mole %; from 30 to 35 mole %; 40 to 100 mole %; from 40 to 99 mole %; 40 to 95 mole %; from 40 to 90 mole %; from 40 to 85 mole %; from 40 to 80 mole %; from 40 to 70 mole %; from 40 to 60 mole %; from 40 to 50 mole %; 50 to 100 mole %; from 50 to 99 mole %; 50 to 95 mole %; from 50 to 90 mole %; from 50 to 85 mole %; from 50 to 80 mole %; from 50 to 70 mole %; from 50 to 60 mole %; 60 to 100 mole %; from 60 to 99 mole %; 60 to 95 mole %; from 60 to 90 mole %; from 60 to 85 mole %; from 60 to 80 mole %; from 60 to 70 mole %; 70 to 100 mole %; from 70 to 99 mole %; 70 to 95 mole %; from 70 to 90 mole %; from 70 to 85 mole %; from 70 to 80 mole %; from 60 to 70 mole %; 80 to 100 mole %; from 80 to 99 mole %; 80 to 95 mole %; from 80 to 90 mole %; 90 to 100 mole %; from 90 to 99 mole %; 90 to 95 mole %; 95 to 100 mole %; or from 95 to 99 mole %.

The polyesters may be prepared by any method known to one of ordinary skill in the art.

The polymer composition useful in the invention can any of the traditional compositions described as polyethylene terephthalate (PET), acid-modified polyethylene terephthalate (PETA), glycol modified PET (PETG), glycol modified poly(cyclohexylene dimethylene terephthalate) (PCTG), poly(cyclohexylene dimethylene terephthalate) (PCT), acid modified poly(cyclohexylene dimethylene terephthalate) (PCTA), and any of the foregoing polyesters modified with 2,2,4,4-tetramethylcyclobutane-1,3-diol (TMCD polyesters), e.g., TMCD-CHDM polyesters, TMCD-EG polyesters, and/or TMCD-CHDM-EG polyesters.

In one aspect, the polyester useful in the polymer compositions of the invention comprises residues of isosorbide. In one embodiment, the isosorbide polymer can also comprise residues of ethylene glycol and/or cyclohexanedimethanol. In embodiments, the polyester comprises residues of isosorbide and 1,4-cyclohexanedimethanol and optionally, ethylene glycol. In embodiments, the polyester comprises residues of isosorbide and ethylene glycol and optionally, 1,4-cycloehexanedimethanol.

For terephthalate based polyesters, terephthalic acid can be present in an amount of from 70 to 100 mole %. Modifying dicarboxylic acids may be present in an amount of up to 30 mole %. In one embodiment, the modifying dicarboxylic acid can be isophthalic acid. Aliphatic diacids can also be present in the terephthalic acid based polyesters of the invention.

In certain embodiments, the polymer compositions of the invention can include copolyesters comprising residues of 70 to 100 mole % terephthalic acid, and optionally, 0.01 to 30 mole %, or 0.01 to 20 mole %, or 0.01 to 10 mole %, or 0.01 to 5 mole % of isophthalic acid, or esters there and/or mixtures thereof.

In certain embodiments, the polymer compositions of the invention can include copolyesters comprising 1,4-cyclohexanedimethanol and, optionally, ethylene glycol. In certain embodiments, the polymer compositions of the invention can include copolyesters comprising from 50 mole % to 100 mole %, or from 60 mole % to 100 mole %, or from 65 mole % to 100 mole %, or from 70 mole % to 100 mole %, or from 75 mole % to 100 mole %, or from 80 mole % to 100 mole %, or from 90 mole % from to 100 mole %, or 95 mole % to 100 mole %, of residues of 1,4-cyclohexanedimethanol and, optionally, from 0 mole % to 50 mole %, or from 0 mole % to 40 mole %, or from 0 mole % to 35 mole %, or from 0 mole % to 30 mole %, or from 0 mole % to 25 mole %, or from 0 mole % to 20 mole %, or from 0 mole % to 10 mole %, or from 0 mole % to 5 mole %, of residues of ethylene glycol.

In certain embodiments, the polymer compositions of the invention can include copolyesters comprising residues of 99 to 100 mole % terephthalic acid and residues of 99 to 100 mole % 1,4-cyclohexanedimethanol. In certain embodiments, the polyester comprises residues of diethylene glycol. In embodiments, the polyester comprises residues of terephthalic acid, isophthalic acid and 1,4-cyclohexanedimethanol. In embodiments, the polyester comprises from 50 mole % to 99.99 mole % of residues of 1,4-cyclohexanedimethanol, 0.01 mole % to 50 mole % of residues of ethylene glycol, and from 70 mole % to 100 mole % of residues of terephthalic acid. In embodiments, the polyester comprises from 80 mole % to 99.99 mole % of residues of 1,4-cyclohexanedimethanol and 0.01 mole % to 20 mole % of residues of ethylene glycol. In embodiments, the polyester comprises from 90 mole % to 99.99 mole % of residues of 1,4-cyclohexanedimethanol and 0.01 mole % to 10 mole % of residues of ethylene glycol. In embodiments, the polyester comprises from 95 mole % to 99.99 mole % of residues of 1,4-cyclohexanedimethanol and 0.01 mole % to 5 mole % of residues of ethylene glycol. In embodiments, the polyester comprises from 95 mole % to 99.99 mole % of residues of 1,4-cyclohexanedimethanol, 0.01 mole % to 10 mole % of residues of ethylene glycol, from 90 mole % to 100 mole % of residues of terephthalic acid, and 0.01 to 10 mole % of residues of isophthalic acid. In embodiments, the polyester comprises from 95 mole % to 100 mole % of residues of 1,4-cyclohexanedimethanol, 0.01 mole % to 5 mole % of residues of ethylene glycol, from 95 mole % to 100 mole % of residues of terephthalic acid, and 0.01 to 5 mole % of residues of isophthalic acid. In embodiments, the polyester consists essentially of residues of terephthalic acid or an ester thereof and 1,4-cyclohexanedimethanol. In embodiments, the polyester comprising consist essentially of residues of terephthalic acid or an ester thereof, 1,4-cyclohexanedimethanol and ethylene glycol. In embodiments, the polyester comprises 0 mole % to 30 mole % or 0 mole % to 20 mole % or 0 mole % to 10 mole % or 0 mole % to 5 mole % or 0.01 mole % to 30 mole % or 0.01 mole % to 20 mole % or 0.01 mole % to 10 mole % or 0.01 mole % to 5 mole % isophthalic acid residues, based on a total of 100 mole % acid residues and a total of 100 mole % of diol residues. In embodiments, the polyester comprises from 20 mole % to less than 50 mole % of residues of 1,4-cyclohexanedimethanol, greater than 50 mole % to 80 mole % of residues of ethylene glycol, and from 70 mole % to 100 mole % of residues of terephthalic acid. In embodiments, the polyester comprises from 20 mole % to 40 mole % of residues of 1,4-cyclohexanedimethanol, 60 mole % to 80 mole % of residues of ethylene glycol, and from 70 mole % to 100 mole % of residues of terephthalic acid. In embodiments, the polyester comprises from 25 mole % to 40 mole % of residues of 1,4-cyclohexanedimethanol, 60 mole % to 75 mole % of residues of ethylene glycol, and from 70 mole % to 100 mole % of residues of terephthalic acid. In embodiments, the polyester comprises from 25 mole % to 35 mole % of residues of 1,4-cyclohexanedimethanol, 65 mole % to 75 mole % of residues of ethylene glycol, and from 70 mole % to 100 mole % of residues of terephthalic acid. In embodiments, the polyester comprises 0 to 20 mole % of residues of 1,4-cyclohexanedimethanol and 80 to 100 of residues of ethylene glycol.

In certain embodiments, the polyester comprises residues of neopentyl glycol. In embodiments, the polyester comprises 2,2,4,4-cyclobutanediol-1,3-cyclobutanediol residues.

In embodiments, the polyester comprises from 0.01 to 99 mole % 2,2,4,4-tetramethyl-1,3-cyclobutanediol residues and from 0.01 to 99 mole % 1,4-cyclohexanedimethanol residues and 70 to 100 mole % terephthalic acid residues. In embodiments, the polyester comprises from 20 to 40 mole % 2,2,4,4-tetramethyl-1,3-cyclobutanediol residues, from 20 to 40 mole % 1,4-cyclohexanedimethanol residues, 20 to 60 mole % of ethylene glycol residues. In embodiments, the polyester comprises from 0.01 to 15 mole % 2,2,4,4-tetramethyl-1,3-cyclobutanediol residues. In embodiments, the polyester comprises from 15 to 40 mole % 2,2,4,4-tetramethyl-1,3-cyclobutanediol residues and from 60 to 85 mole % 1,4-cyclohexanedimethanol residues. In embodiments, the polyester comprises from 20 to 40 mole % 2,2,4,4-tetramethyl-1,3-cyclobutanediol residues and from 60 to 80 mole % 1,4-cyclohexanedimethanol residues. In embodiments, the polyester comprises from 20 to 30 mole % 2,2,4,4-tetramethyl-1,3-cyclobutanediol residues and from 70 to 80 mole % 1,4-cyclohexanedimethanol residues and 70 to 100 mole % terephthalic acid residues. In embodiments, the polyester comprises from 30 to 40 mole % 2,2,4,4-tetramethyl-1,3-cyclobutanediol residues and from 60 to 70 mole % 1,4-cyclohexanedimethanol residues and 70 to 100 mole % terephthalic acid residues.

In embodiments, the polyester component comprises residues of 1,4-cyclohexanedicarboxylic acid or an ester thereof. In embodiments, the polyester component comprises residues of dimethyl-1,4-cyclohexanedicarboxylate. In embodiments, the polyester component comprises residues 1,4-cyclohexanedicarboxylic acid or an ester thereof in the amount of from 70 to 100 mole % or from 80 to 100 mole % or from 90 to 100 mole % or from 95 to 100 mole % or from 98 to 100 mole %, based on a total of 100 mole % acid residues and a total of 100 mole % diol residues.

In some aspects of the invention, the copolyesters useful in the invention may comprise a diacid component comprising at least 70 mole % of residues of terephthalic acid, isophthalic acid, or mixtures thereof; and a diol component comprising (a) the residues of 2,2,4,4-tetramethyl-1,3-cyclobutanediol and residues of 1,4-cyclohexanedimethanol and/or residues of ethylene glycol (TMCD copolyesters).

In one embodiment, the polyester can comprise from 0.01 to 99.99 mole % 2,2,4,4-tetramethyl-1,3-cyclobutanediol residues and 99.99 to 0.01 mole % ethylene glycol residues, or from 20 to 45 mole % 2,2,4,4-tetramethyl-1,3-cyclobutanediol residues and 55 to 80 mole % ethylene glycol residues, or from 20 to less than 50 mole % 2,2,4,4-tetramethyl-1,3-cyclobutanediol residues and greater than 50 to 80 mole % ethylene glycol residues, or from 15 to 40 mole % 2,2,4,4-tetramethyl-1,3-cyclobutanediol residues and 60 to 85 mole % ethylene glycol, or from 20 to 40 mole % 2,2,4,4-tetramethyl-1,3-cyclobutanediol residues and 60 to 80 mole % ethylene glycol residues, or from 20 to 30 mole % 2,2,4,4-tetramethyl-1,3-cyclobutanediol residues and 70 to 80 mole % ethylene glycol residues, or from 30 to 40 mole % 2,2,4,4-tetramethyl-1,3-cyclobutanediol residues and 60 to 70 mole % ethylene glycol residues, or from 0.01 to 15 mole % 2,2,4,4-tetramethyl-1,3-cyclobutanediol residues and 85 to 99.99 mole % ethylene glycol residues, or from 20 to 40 mole % 2,2,4,4-tetramethyl-1,3-cyclobutanediol residues, from 20 to 40 mole % 1,4-cyclohexanedimethanol residues and 20 to 60 mole % of ethylene glycol residues, and, for all of these ranges, optionally, 70 to 100 mole % terephthalic acid or isophthalic residues or mixtures thereof, based on a total of 100 mole % acid residues and a total of 100 mole % diol residues.

In one embodiment, the polyester can comprise from about 10 to 45 mole % 2,2,4,4-tetramethyl-1,3-cyclobutanediol residues, from about 55 to 90 mole % of ethylene glycol residues, and from about 0 to 100 mole % of 1,4-cyclohexanedimethanol residues.

In one embodiment, the polyester can comprise from about 15 to 30 mole % 2,2,4,4-tetramethyl-1,3-cyclobutanediol residues, from about 55 to 90 mole % of ethylene glycol residues, and from about 0 to 100 mole % of 1,4-cyclohexanedimethanol residues.

In one embodiment, the polyester can comprise 20 to 40 mole % 2,2,4,4-tetramethyl-1,3-cyclobutanediol residues and 60 to 80 mole % 1,4-cyclohexanedimethanol residues and 70 to 100 mole % terephthalic acid residues, based on a total of 100 mole % acid residues and a total of 100 mole % diol residues.

In one embodiment, the polyester can comprise 20 to 30 mole % 2,2,4,4-tetramethyl-1,3-cyclobutanediol residues and 70 to 80 mole % 1,4-cyclohexanedimethanol residues and 70 to 100 mole % terephthalic acid residues, based on a total of 100 mole % acid residues and a total of 100 mole % diol residues.

In certain embodiments, the polymer compositions of the invention may can include copolyesters comprising, optionally, 0.01 to 30 mole %, or 0.01 to 20 mole %, or 0.01 to 10 mole %, or 0.01 to 5 mole % of terephthalic acid and/or isophthalic acid, or esters there and/or mixtures thereof; and a diol component comprising: (a) from 20 to less than 50 mole % of 1,4-cyclohexanedimethanol and residues from greater than 50 to 80 mole % ethylene glycol residues; or from 20 to 40 mole % of 1,4-cyclohexanedimethanol residues and from 60 to 80 mole % ethylene glycol residues, or from 20 to 40 mole % of 1,4-cyclohexanedimethanol residues and from 60 to 80 mole % ethylene glycol residues, or from 25 to 40 mole % of 1,4-cyclohexanedimethanol residues and from 60 to 75 mole % ethylene glycol residues, or from 25 to 35 mole % of 1,4-cyclohexanedimethanol residues and from 65 to 75 mole % ethylene glycol residues (PETG); or (b) from 50 mole % to 99.99 mole %, or from 55 mole % to 99.99 mole %, or from 60 mole % to 99.99 mole %, or from 65 mole % to 99.99 mole %, or from 70 mole % to 99.99 mole %, or from 75 mole % to 99.99 mole %, or from 80 mole % to 99.99 mole %, or from 85 mole % to 99.99 mole %, or from 90 mole % from to 99.99 mole %, or 95 mole % to 99.99 mole %, of residues of 1,4-cyclohexanedimethanol and from 0.01 mole % to 50 mole %, or from 0.01 mole % to 45 mole %, or from 0.01 mole % to 40 mole %, or from 0.01 mole % to 35 mole %, or from 0.01 mole % to 30 mole %, or from 0.01 mole % to 25 mole %, or from 0.01 mole % to 20 mole %, or from 0.01 mole % to 15 mole %, or from 0.01 mole % to 10 mole %, or from 0.01 mole % to 5 mole %, of residues of ethylene glycol (PCTG); or (c) from 95 to 99.99 mole %, of residues of 1,4-cyclohexanedimethanol and from 0.01 to 10 mole % or from 0.01 to 5 mole % of residues of isophthalic acid, and from 0.01 to 10 mole % or from 0.01 to 5 mole % of residues of ethylene glycol (PCTA) or (d) 0 to 20 mole % of residues of 1,4-cyclohexanedimethanol and 80 to 100 mole % of residues of ethylene glycol (PET or glycol modified PET) or (e) isosorbide polymers comprising 1,4-cyclohexanedimethanol and optionally, ethylene glycol or (f) isosorbide polymers comprising ethylene glycol, or (g) (PCT as defined herein), or (h) TMCD polymers as described herein. In certain embodiments, the diol component can comprise from 10 mole % to 40 mole %, or from 15 mole % to 35 mole %, or from 20 mole % to 35 mole %, or from 20 mole % to 30 mole %, or from 20 mole % to 40 mole %, or from 20 mole % to 35 mole %, of residues of isosorbide; from 30 mole % to 70 mole %, or from 40 mole % to 70 mole %, or from 45 mole % to 65 mole %, or from 45 mole % to 60 mole %, or from 45 mole % to 55 mole %, or from 47 mole % to 65 mole %, or from 48 mole % from to 65 mole %, or 49 mole % to 65 mole %, or 50 mole % to 65 mole %, or from 47 mole % to 60 mole %, or from 48 mole % from to 60 mole %, or 49 mole % to 60 mole %, or 50 mole % to 60 mole %, of residues of 1,4-cyclohexanedimethanol and, optionally, from 0 mole % to 40 mole %, or from 0 mole % to 35 mole %, or from 0 mole % to 30 mole %, or from 0 mole % to 25 mole %, or from 0 mole % to 20 mole %, or from 0 mole % to 15 mole %, or from 0 mole % to 10 mole %, or from 0 mole % to 5 mole %, of residues of ethylene glycol. In one embodiment, the diol component can comprise from 18 mole % to 35 mole %, or from 20 mole % to 35 mole %, of residues of isosorbide; from 40 mole % to 58 mole %, or from 45 mole % to 55 mole %, of residues of 1,4-cyclohexanedimethanol; and, from 15 mole % to 25 mole %, or from 20 mole % to 25 mole %, of residues of ethylene glycol.

In one embodiment, the polyesters useful in polymer compositions of the invention can also comprise copolyester ethers (COPE), e.g., (PCCE) commercially available, for example, from Eastman Chemical Company. The term "polyesters" as used herein, is intended to include copolyesterethers.

The COPE polymer has high melt strength, thus allowing articles to be blow molded from the molten polymer. Other desirable properties which make the COPE polymer especially useful in the manufacture of products such as medical supplies include its high level of clarity and low odor. Furthermore, the COPE polymer has a fast crystallization rate, allowing reasonably fast rates of production for molded articles such as bags, bottles or cast film.

The copolyesterethers according to this invention are derived from a dicarboxylic acid component comprising and/or consisting essentially of 1,4-cyclohexanedicarboxylic acid or an ester forming derivative thereof such as dimethyl-1,4-cyclohexanedicarboxylate. This acid and ester are both sometimes referred to herein as DMCD. The diol component consists essentially of 1,4-cyclohexanedimethanol (CHDM) and polytetramethylene ether glycol (PTMG). The copolyesterethers further can comprise branching agents, for example, from about 0.1 to about 1.5 mole %, based on the acid or glycol component, of a polyfunctional branching agent having at least 3 carboxyl or hydroxyl groups.

In embodiments, the dibasic acid component of the copolyesterether comprises residues of 1,4-cyclohexanedicarboxylic acid or dimethyl-1,4-cyclohexanedicarboxylate having a trans isomer content of at least 70% or at least 80% or at least 85%. In an embodiment, the dibasic acid component of the copolyesterether of this invention consists essentially of DMCD and can have a trans isomer content of at least 70%, or at least 80% or at least 85%.

The polyesterether useful in the polymer compositions of the invention wherein the polyester component comprises residues 1,4-cyclohexanedicarboxylic acid or an ester thereof in the amount of from 70-100 weight % or from 80 to 100 weight % or from 90 to 100 mole % or from 95 to 100 mole % or from 98 to 100 mole %, based on a total of 100 mole % acid residues and a total of 100 mole % diol residues. The polyesterether can comprise residues of 1,4-cyclohexanedimethanol and polytetramethylene ether glycol.

The polyesterether can comprise residues of from 15 mole % to 50 mole % or from 20 weight % to 50 weight % or from 25 to 50 weight % or from 30 to 50 weight % or from 35 to 50 weight % or from 40 to 50 weight % or from 45 to 50 weight % or from 15 weight % to 45 weight % or from 20 weight % to 45 weight % or from 25 to 45 weight % or from 30 to 45 weight % or from 35 to 45 weight % or from 40 to 45 weight % or from 15 weight % to 40 weight % or from 20 weight % to 40 weight % or from 25 to 40 weight % or from 30 to 40 weight % or from 35 to 40 weight % or from 15 weight % to 35 weight % or from 20 weight % to 35 weight % or from 25 to 35 weight % or from 15 weight % to 30 weight % or from 20 weight % to 30 weight % or from 25 to 30 weight % or from 15 weight % to 25 weight % of polytetramethylene ether glycol residues.

In one embodiment, the polyesterether can comprise residues of from 20 weight % to 50 weight %, or from 25 weight % to 45 weight %, or from 30 to 40 weight % of polytetramethylene ether glycol residues.

In one embodiment, the polyester portion of the polyesterether comprises residues of at least one glycol as described for the polyesters useful in the invention. In certain embodiments, the polyester portion of the polyesterether comprises residues of at least one glycol selected from ethylene glycol, diethylene glycol, triethylene glycol, isosorbide, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane, 2,2-bis-(4-hydroxypropoxyphenyl)-propane, and mixtures thereof.

The polyesterether can comprise residues of from 15 weight % to 50 weight %, or from 15 weight % to 45 weight %, or from 15 weight % to 40 weight %, or from 15 weight % to 35 weight %, or from 15 weight % to 30 weight %, or from 20 weight % to 50 weight %, or from 20 weight % to 45 weight % of 1,4-cyclohexanedimethanol residues.

In one embodiment, useful copolyesterethers can have an inherent viscosity of from about 0.70 to about 1.5 dL/g as determined in 60/40 (wt/wt) phenol/tetrachloroethane at a concentration of 0.5 g/100 ml at 25° C. comprising
  A. a dicarboxylic acid component comprising and/or consisting essentially of 1,4-cyclohexanedicarboxylic acid, and
  B. a glycol component consisting essentially of
    (1) 1,4-cyclohexanedimethanol,
    (2) from about 15 to about 50 weight %, or from 20 to 35 weight %, based on the weight of the polyesterether, of polytetramethyleneether glycol having a weight average molecular weight of about 500 to about 2000.

In one embodiment, useful copolyesterethers can have an inherent viscosity of from about 0.70 to about 1.5 dL/g as determined in 60/40 (wt/wt) phenol/tetrachloroethane at a concentration of 0.5 g/100 ml at 25° C. comprising
  A. a dicarboxylic acid component comprising and/or consisting essentially of 1,4-cyclohexanedicarboxylic acid, B. a glycol component consisting essentially of
  (1) 1,4-cyclohexanedimethanol,
  (2) from about 15 to about 50 weight %, or from 20 to 35 weight %, based on the weight of the polyesterether, of polytetramethyleneether glycol having a weight average molecular weight of about 500 to about 2000,
  (3) from about 0.1 to about 1.5 mole %, or 0.1 to 1.0 mole % based on the total mole % of the acid or glycol component, of a branching agent having at least three COOH or OH functional groups and from 3 to 60 carbon atoms.

DMCD and CHDM are well known in the art and commercially available. "Man-Made Fibers: Science and Technology," Vol. III, edited by Mark, Atlas and Cernia, published by Interscience Publishers describes preparation of DMCD and CHDM at page 85.

The PTMG component of the copolyesterethers useful in this invention is commercially available, and can be prepared by well known techniques. The PTMG used in the copolyesterether of this invention has a molecular weight of between about 500 and about 1100, or about 1000. It is used in an amount of from about 15 to about 50%, or from about 20-35%, based on the total weight of the copolyesterether.

The copolyesterether of this invention further can comprise the same mole ages of residues of at least one branching agent as described for the other polyesters useful in the invention. In one embodiment, the branching agent can be present in an amount from about 0.1 to about 1.5 mole %, based on the acid or glycol component, of a polybasic acid or polyhydric alcohol branching agent having at least three COOH or OH functional groups and from 3 to 60 carbon atoms. Esters of many such acids or polyols may also be used.

It should be understood that the total acid reactants for the polyesterether useful in the invention should be 100 mole %, and the total glycol reactants should be 100 mole %. If the branching agent used is a polybasic acid or anhydride, it will be calculated as part of the 100 mole % acid residues. Likewise, if the branching agent is a polyol, it will be calculated as part of the 100 mole % glycol. In some embodiments, the components of the COPE are specified in weight percentages herein, based on the total weight of the polyesterether equaling 100 weight %.

In other embodiments, the polyesterether may contain from about 0.1 to about 1.5 mole %, or 0.1 to 1.0 mole %, based on the total mole % of the acid or glycol component, of a branching agent having at least three COOH or OH functional groups and from 3 to 60 carbon atoms as well.

In one embodiment, the copolyesterether has an I.V. of about 0.7 to about 1.5 dL/g as determined in. 60/40 (wt/wt) phenol/tetrachloroethane at a concentration of 0.5 g/100 ml at 25° C.

The polytetramethylene ether glycol component of the copolyesterether is commercially available, and can be prepared by any technique known in the art. In one embodiment, the polytetramethylene ether glycol can have a molecular weight of between about 500 to about 2000, or about 800 to 2000, or about 500 to about 1200, or about 500 to about 1100, or about 800 to about 1200.

The copolyesterether further can optionally comprise up to about 1.5 mole % based on the acid or glycol component, of a polybasic or polyhydric alcohol branching agent having at least three COOH or OH functional groups and from 3 to 60 carbon atoms. Esters of many such acids or polyols may also be used. In one embodiment of the invention, the copolyesterethers of the invention do not include poly (arylene ethers). In another embodiment of the invention, blends of poly(arylene ethers) with other polymers are not included within the scope of the invention.

In one embodiment, at least one branching agent useful in the COPE or in the other polymers of the invention can be trimellitic acid or trimellitic anhydride or combinations thereof. Although the acid reactant is said to "consist essentially of" 1,4-cyclohexanedicarboxylic acid, if the branching agent is a polybasic acid or anhydride, it will be calculated as part of the 100 mole % acid residues. Likewise, the glycol component is said to "consist essentially of: 1,4-cyclohexanedimethanol and polytetramethylene ether glycol, if the branching agent is a polyol, it will be calculated as part of the 100 mole % glycol.

In embodiments of the invention, the condensation polymer, polyester or polyester portion of the polyesterether comprises residues of a branching agent. In embodiments, the polyester or the polyester component of said polyesterether comprises 0.01 to 5 mole % or 0.01 to 4 mole % or from 0.01 to 3 mole % or from 0.01 to 2 mole % or from 0.01 to about 1.5 mole % or from 0.01 to 1 mole % or from 0.1 to 5 mole % or 0.1 to 4 mole % or from 0.1 to 3 mole % or from 0.1 to 2 mole % or from 0.1 to about 1.5 mole % or from 0.1 to 1 mole or from 0.5 to 5 mole % or 0.5 to 4 mole % or from 0.5 to 3 mole % or from 0.5 to 2 mole % or from 0.5 to about 1.5 mole % or from 0.5 to 1 mole % or from 1 to 5 mole % or 1 to 4 mole % or from 1 to 3 mole % or from 1 to 2 mole % of at least one branching agent or at least one polyfunctional branching agent, based on a total of 100 mole % acid residues and a total of 100 mole % diol residues. In embodiments, the polyfunctional branching agent has at least 3 carboxyl or hydroxyl groups. In embodiments, the polyfunctional branching agent comprises residues of trimellitic acid, trimellitic anhydride, trimesic acid, trimethyol ethane, trimethyolpropane, pentaerythritol, glycerine, tetra-maleaic anhydride, and trimer acid. In embodiments, the polyfunctional branching agent comprises residues of trimellitic anhydride, trimethyolpropane, pentaerythritol, glycerine, tetra-maleaic anhydride.

In other aspects of the invention, the Tg of the polyesters or copolyesters useful in the invention can be, but is not limited to, at least one of the following ranges: −10 to 130° C.; −10 to 125° C.; −10 to 120° C.; −10 to 115° C.; −10 to 110° C.; −10 to 105° C.; −10 to 70° C.; −10 to 65° C.; −10 to 60° C.; −10 to 55° C.; −10 to 50° C.; −10 to 45° C.; −10 to 40° C.; −10 to 35° C.; −10 to 30° C.; −10 to 25° C.; −10 to 20° C.; −10 to 15° C.; −5 to 130° C.; −5 to 125° C.; −5 to 120° C.; −5 to 115° C.; −5 to 110° C.; −5 to 105° C.; −5 to 70° C.; −5 to 65° C.; −5 to 60° C.; −5 to 55° C.; −5 to 50° C.; −5 to 45° C.; −5 to 40° C.; −5 to 35° C.; −5 to 30° C.; −5 to 25° C.; −5 to 20° C.; −5 to 15° C.; 60 to 130° C.; 60 to 125° C.; 60 to 120° C.; 60 to 115° C.; 60 to 110° C.; 60 to 105° C.; 60 to 100° C.; 60 to 95° C.; 65 to 130° C.; 65 to 125° C.; 65 to 120° C.; 65 to 115° C.; 65 to 110° C.; 65 to 105° C.; 65 to 100° C.; 65 to 95° C.; 70 to 130° C.; 70 to 125° C.; 70 to 120° C.; 70 to 115° C.; 70 to 110° C.; 70 to 105° C.; 75 to 130° C.; 75 to 125° C.; 75 to 120° C.; 75 to 115° C.; 75 to 110° C.; 75 to 105° C.; 85 to 130° C.; 85 to 125° C.; 85 to 120° C.; 85 to 1150; 85 to 110° C.; 85 to 105° C.; 85 to 100° C.; 85 to 95° C.; 80 to 130° C.; 80 to 125° C.; 80 to 120° C.; 80 to 115° C.; 80 to 110° C.; 80 to 105° C.; 80 to 100° C.; 85 to 130° C.; 85 to 125° C.; 85 to 120° C.; 85 to 115° C.; 85 to 110° C.; 85 to 105° C.; 85 to 100° C.; 85 to 95° C.; 90 to 130° C.; 90 to 125° C.; 90 to 120° C.; 90 to 115° C.; 90 to 110° C.; 90 to 105° C.; 90 to 100° C.; 95 to 130° C.; 95 to 125° C.; 95 to 120° C.; 95 to 115° C.; 95 to 110° C.; 95 to 105° C.; 100 to 130° C.; 100 to 125° C.;

100 to 120° C.; 100 to 115° C.; 100 to 110° C.; 105 to 130° C.; 105 to 125° C.; 105 to 120° C.; 105 to 115° C.; 110 to 130° C.; 110 to 125° C.; 110 to 120° C.; 115 to 130° C.; 115 to 125° C.; 115 to 120° C.; 115 to 130° C.; 115 to 125° C.; 115 to 120° C.; and 120 to 130° C., as measured by ASTM Method 3418.

For certain embodiments of the invention, the condensation polymers, e.g., polyesters, useful in the invention may exhibit at least one of the following inherent viscosities as determined in 60/40 (wt/wt) phenol/tetrachloroethane at a concentration of 0.5 g/100 ml at 25° C.: one of the following ranges: 0.35 to 1.5 dL/g; 0.35 to 1.2 dL/g; 0.35 to 1 dL/g; 0.50 to 1.5 dL/g; 0.50 to 1.2 dL/g; 0.50 to 1 dL/g; 0.50 to 0.85 dL/g; 0.50 to 80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.5 dL/g; 0.55 to 1.2 dL/g; 0.55 to 1 dL/g; 0.55 to 0.85 dL/g; 0.55 to 0.80 dL/g; 0.55 to 0.78 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.60 to 1.5 dL/g; 0.60 to 1.2 dL/g; 0.60 to 0.80 dL/g; 0.60 to 0.75 dL/g; 0.60 to 0.68 dL/g; 0.70 to 1.5 dL/g 0.70 to 1.2 dL/g; 0.80 to 1.5 dL/g; and 0.80 to 1.2 dL/g.

For certain embodiments of the invention, the polyesters useful in the invention may exhibit at least one of the following inherent viscosities as determined in 60/40 (wt/wt) phenol/tetrachloroethane at a concentration of 0.5 g/100 ml at 25° C.: 0.70 to 1.2 dL/g; 0.70 to 1.1 dL/g; 0.70 to 1 dL/g; 0.70 to less than 1 dL/g; 0.70 to 0.98 dL/g; 0.70 to 0.90 dL/g; 0.70 to 0.85 dL/g; 0.70 to 0.80 dL/g; 0.70 to 1.2 dL/g; 0.70 to 1.1 dL/g; 0.70 to 1 dL/g; 0.70 to less than 1 dL/g; 0.70 to 0.98 dL/g; 0.70 to 0.90 dL/g; 0.70 to 0.85 dL/g; 0.70 to 0.80 dL/g; 0.75 to 1.2 dL/g; 0.75 to 1.1 dL/g; 0.75 to 1 dL/g; 0.75 to 0.98 dL/g; 0.75 to 0.90 dL/g; 0.75 to 0.85 dL/g; 0.80 to 1.2 dL/g; 0.80 to 1.1 dL/g; 0.80 to 1 dL/g; 0.80 to less than 1 dL/g; 0.80 to 0.98 dL/g; 0.80 to 0.90 dL/g; 0.70 to 0.80 dL/g; 0.90 to 1.2 dL/g; 0.90 to 1.1 dL/g; and 0.90 to 1 dL/g.

It is contemplated that the polyester compositions of the invention can possess at least one of the inherent viscosity ranges described herein and at least one of the monomer ranges for the compositions described herein unless otherwise stated. It is also contemplated that the polyester compositions of the invention can possess at least one of the Tg ranges described herein and at least one of the monomer ranges for the compositions described herein unless otherwise stated. It is also contemplated that the polyester compositions of the invention can possess at least one of the Tg ranges described herein, at least one of the inherent viscosity ranges described herein and at least one of the monomer ranges for the compositions described herein unless otherwise stated.

In one embodiment, the present invention can employ a primary antioxidant of the hindered phenol type, a secondary antioxidant in the phosphite family and a chain extending agent with epoxide functionalities.

Several characteristics can be considered in the choice of a hindered phenolic antioxidant including the relative phenol content, which affects its reactivity, and the molecular weight sufficiently high to ensure that the antioxidant does not migrate easily out of the polymer In a further embodiment, the antioxidant is a primary antioxidant, a secondary antioxidant, or combinations thereof. In a still further aspect, the primary antioxidant is selected from at least one hindered phenol, at least one secondary aryl amine, or a combination thereof.

In one embodiment, the phenolic antioxidant can be sterically hindered and/or relatively non-volatile. Examples of suitable phenolic antioxidants include hydroquinone, arylamine antioxidants such as 4,4'-bis(α,α-dimethylbenzyl)diphenylamine, hindered phenol antioxidants such as 2,6-di-tert-butyl-4-methylphenol, butylated p-phenyl-phenol and 2-(a-methylcyclohexyl)-4,6-dimethylphenol; bisphenols such as 2,2'-methylenebis-(6-tert-butyl-4-methylphenol), 4,4'bis(2,6-di-tert-butylphenol), 4,4'-methylenebis(6-tert-butyl-2-methylphenol), 4,4'-butylenebis(6-tert-butyl-3-methylphenol), methylenebis(2,6-ditertbutylphenol), 4,4'-thiobis(6-tert-butyl-2-methylphenol), and 2,2'-thiobis(4-methyl-6-tert-butylphenol); tris-phenols such as 1,3,5-tris(3,5-di-tert-butyl-4-hydroxyhydrocinnamoyl)-hexahydro-s-triazine, 1,3,5-trimethyl-2,4,6-tris(3,5-di-tert-butyl-4-hydroxybenzyl)benzene and tri(3,5-di-tert-butyl-4-hydroxyphenyl)phosphite; and pentaerythritol tetrakis[3-(3,5-di-t-butyl-4-hydroxyphenyl)propionate] the last of which is commercially available as Irganox™ 1010 antioxidant.

In a further aspect, the at least one hindered phenol useful in the polymer compositions of the invention comprises one or more compounds selected from triethylene glycol bis[3-(3-t-butyl-5-methyl-4-hydroxyphenyl)propionate], 1,6-hexanediolbis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, benzenepropanoic acid 3,5-bis(1,1-dimethylethyl)-4-hydroxy-2,2-bis[[3-[3,5-bis(1,1-dimethylethyl)-4-hydroxyphenyl]-1-oxopropoxy]methyl]-1,3-propanediyl ester, N,N'-hexamethylene bis(3,5-di-t-butyl-4-hydroxyhydrocinnamamide), tetrakis(methylene 3,5-di-tert-butyl-hydroxycinnamate)methane, 4-[[4,6-bis(octylthio)-1,3,5-triazin-2-yl]amino]-2,6-bis(1,1-dimethylethyl)phenol (Irganox®565), and octadecyl 3,5-di-tert-butylhydroxyhydrocinnamate.

In one embodiment, the phenolic antioxidants useful in the polymer compositions of the invention can be octadecyl-3-(3,5-di-tert.butyl-4-hydroxyphenyl)-propionate (CAS number 2082-79-3; pentaerythritol tetrakis[3-(3,5-di-t-butyl-4-hydroxyphenyl)propionate] (CAS #6683-198, otherwise known as Irganox™ 1010); N,N'-hexane-1,6-diyl-bis[3-(3,5-ditert-butyl-4-hydroxyphenyl]propionamide] (CAS #23128-747-, Irganox™1098); benzenepropanoic acid 3,5-bis(1,1-dimethylethyl)-4-hydroxyoctadecyl ester (Irganox™1076). The Irganox phenolic brand of additives can be commercially obtained from BASF). In a further aspect, the hindered phenol comprises octadecyl-3-(3,5-di-t-butyl-4-hydroxyphenyl)-propionate. In an even further aspect, at least one hindered phenol is 3,5-bis(1,1-dimethylethyl)-4-hydroxy-2,2-bis[[3-[3,5-bis(1,1-dimethylethyl)-4-hydroxyphenyl]-1-oxopropoxy]methyl]-1,3-propanediyl ester.

In one embodiment, the primary antioxidant is present in the amount of from 0.01 to 5 weight %, or from 0.01 weight % to 4 weight %, or from 0.01 weight % to 3 weight %, or from 0.01 weight % to 2.0 weight %, or from 0.01 weight % to 1.0 weight %, or from 0.01 weight % to 0.90 weight %, or from 0.01 weight % to 0.80 weight %, or from 0.01 weight % to 0.75 weight %, or from 0.01 to 0.70 weight %, or from 0.01 to 0.60 weight %, or from 0.01 weight % to 0.50 weight % or from 0.10 weight % to 5 weight %, or from 0.10 weight % to 4 weight %, or from 0.10 weight % to 3 weight %, or from 0.10 weight % to 2.0 weight %, or from 0.10 weight % to 1.0 weight %, or from 0.10 weight % to 0.90 weight %, or from 0.10 weight % to 0.80 weight %, or from 0.10 weight % to 0.75 weight %, or from 0.10 weight % to 0.70 weight %, or from 0.10 weight % to 0.60 weight %, or from 0.10 weight % to 0.50 weight based on the total weight of the polymer composition equaling 100 weight %.

In certain aspects of the invention, the primary antioxidant can be present (total loading) in the polymer compositions of the invention in the amount of from 0.01 to 2.0 weight % or from 0.01 to 1.5 or from 0.01 to 1 weight % or from 0.01 to 0.75 weight % or from 0.01 to 0.50 weight % or from or from 0.10 weight % to 5 weight % or from 0.10 weight % to 4 weight % or from 0.10 weight to 3 weight % or from 0.10 to 2.0 weight % or from 0.10 to 1.5 or from 0.10 to 1 weight % or from 0.10 to 0.75 weight % or from 0.10 to 0.60 weight % or from, based on the total weight of the polymer composition equaling 100 weight %.

In certain aspects of the invention, the primary antioxidant can be present (total loading) in the polymer compositions of the invention in the amount of from 0.01 to 2.0 weight %, or from 0.10 to 2.0 weight %, from 0.01 to 1.0 weight %, or from 0.10 to 1.0 weight %, or from 0.10 to 1.5, or from 0.50 to 1.5, or from 0.75 to 1.25, or from 0.10 to 0.60, or from 0.10 to 0.50 weight %, or from 0.10 to 0.40, based on the total weight of the polymer composition equaling 100 weight %.

A secondary antioxidant is useful in the present invention. Molecular weight, reactivity and hydrolytic stability can be considered in the choice of secondary antioxidant. Some examples of secondary antioxidants are thiodipropionates, phosphites and metal salts. Thiopropionates are mostly used in polyolefins. Phosphites are secondary antioxidants useful in one embodiment of this invention.

The secondary antioxidant can be selected from an organophosphate or thioester, or a combination thereof. In a still further aspect, the secondary anti-oxidant comprises one or more compounds selected from tris(nonyl phenyl)phosphite [Weston™399, available from Addivant, Connecticut), tetrakis(2,4-di-tert-butylphenyl) [1,1-biphenyl]-4,4'-diyl-bisphosphonite, tris(2,4-di-tert-butylphenyl)phosphite (Irgafos™168, available from BASF), bis(2,4-di-tert-butylphenyl)pentaerythritol diphosphite, bis(2,4-dicumylphenyl)pentaerythritoldiphosphite, and distearyl pentaerythritol diphosphite.

In one embodiment, the polymer composition of the invention contains at least one phosphite comprising an aryl phosphite or an aryl monophosphite. As used herein, the term "aryl monophosphite" refers to a phosphite stabilizer which contains (1) one phosphorus atom per molecule; and (2) at least one aryloxide (which may also be referred to as a phenoxide) radical which is bonded to the phosphorus. In one embodiment, the aryl monophosphite contains $C_1$ to $C_{20}$, or $C_1$ to $C_{10}$, or $C_2$-$C_6$ alkyl substituents on at least one of the aryloxide groups. Example of $C_1$ to $C_{20}$ alkyl substituents include but are not limited to methyl, ethyl, n-propyl, isopropyl, n-butyl, sec-butyl and iso-butyl, tertiary butyl, pentyl, hexyl, octyl, nonyl, and decyl. Preferred aryl groups include but are not limited to phenyl and naphthyl.

In one embodiment, the phosphites useful in the invention comprise tertiary butyl substituted aryl phosphites. In another embodiment, the aryl monophosphite comprises at least one of triphenyl phosphite, phenyl dialkyl phosphites, alkyl diphenyl phosphites, tri(nonylphenyl)phosphite, tris-(2,4-di-t-butylphenyl)phosphite, bis(2,4-di-t-butyl-6-methylphenyl)ethyl phosphite, (believed to be Irgafos™38, available from BASF), 2,2,2-nitrilo[triethyltris(3,3,5,5-tetra-tert-butyl-1,1-biphenyl-diyl)phosphite (believed to be Irgafos™12, available from BASF. In another embodiment, the aryl monophosphite is selected from one or more of tris-(2,4-di-t-butylphenyl)phosphite, bis(2,4-di-t-butyl-6-methylphenyl)ethyl phosphite, and 2,2,2-nitrilo[triethyltris(3,3,5,5-tetra-tert-butyl-1,1-biphenyl-diyl)phosphite. In a further embodiment, an aryl monophosphite useful in the invention is tris-(2,4-di-t-butylphenyl)phosphite.

In one embodiment, suitable secondary antioxidant additives include, for example, organic phosphites such as, tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; or combinations comprising at least one of the foregoing antioxidants.

In one embodiment, the secondary antioxidant is present in the amount of from 0.01 to 5 weight %, or from 0.01 weight % to 4 weight %, or from 0.01 weight % to 3 weight %, or from 0.01 weight % to 2.0 weight %, or from 0.01 weight % to 1.0 weight %, or from 0.01 weight % to 0.90 weight %, or from 0.01 weight % to 0.80 weight %, or from 0.01 weight % to 0.75 weight %, or from 0.01 to 0.70 weight %, or from 0.01 to 0.60 weight %, or from 0.01 weight % to 0.50 weight % or from 0.10 weight % to 5 weight %, or from 0.10 weight % to 4 weight %, or from 0.10 weight % to 3 weight %, or from 0.10 weight % to 2.0 weight %, or from 0.10 weight % to 1.0 weight %, or from 0.10 weight % to 0.90 weight %, or from 0.10 weight % to 0.80 weight %, or from 0.10 weight % to 0.75 weight %, or from 0.10 weight % to 0.70 weight %, or from 0.10 weight % to 0.60 weight %, or from 0.10 weight % to 0.50 weight based on the total weight of the polymer composition equaling 100 weight %.

In certain aspects of the invention, the secondary antioxidant can be present (total loading) in the polymer compositions of the invention in the amount of from 0.01 weight % to 5 weight % or from 0.01 weight % to 4 weight % or from 0.01 weight to 3 weight % from 0.01 to 2.0 weight % or from 0.01 to 1.5 or from 0.01 to 1 weight % or from 0.01 to 0.75 weight % or from 0.10 to 0.60 weight % or from 0.01 to 0.50 weight % or from 0.01 to 0.40 weight % or from 0.10 weight % to 5 weight % or from 0.10 weight % to 4 weight % or from 0.10 weight to 3 weight % or from 0.10 to 2.0 weight % or from 0.10 to 1.5 or from 0.10 to 1 weight % or from 0.10 to 0.75 weight % or from 0.10 to 0.60 weight % or from, based on the total weight of the polymer composition equaling 100 weight %.

In certain aspects of the invention, the secondary antioxidant can be present (total loading) in the polymer compositions of the invention in the amount of from 0.01 to 2.0 weight %, or from 0.01 to 1.5 weight %, or from 0.01 to 1.0, or from 0.01 to 0.60, or from 0.01 to 0.50 weight %, or from 0.01 to 0.040, or from 0.10 to 2.0 weight %, or from 0.10 to 1.5 weight %, or from 0.10 to 1.0 weight %, or from 0.10 to 0.60, or from 0.10 to 0.50 weight %, or from 0.10 to 0.040 weight %, based on the total weight of the polymer composition equaling 100 weight %

In certain aspects of the invention, the weight ratio of primary antioxidant to secondary antioxidant present in the polymer compositions useful in the invention can be from is from 0.25:2.0, or from 0.25:1.75, or from 0.25:1.50, or from 0.50:2.0, or from 0.50:1.50, or from 0.75:1.25, or from 0.80:1.2, or from 0.80:1.5, or from 0.90:1.10, or from 0.90:1.10, or from 1:1.

The polymers of the invention can comprise at least one chain extending agent. Suitable chain extending agents include, but are not limited to, multifunctional (including, but not limited to, bifunctional) isocyanates, multifunctional epoxides, including for example, and phenoxy resins. In one embodiment, the chain extending agents have epoxide dependent groups. In one embodiment, the chain extending additive can be one or more styrene-acrylate copolymers with epoxide functionalities. In one embodiment, the chain extending additive can be one or more copolymers of glycidyl methacrylate with styrene.

In certain embodiments, chain extending agents may be added at the end of the polymerization process or after the polymerization process. If added after the polymerization process, chain extending agents can be incorporated by compounding or by addition during conversion processes such as injection molding or extrusion. The amount of chain extending agent used can vary depending on the specific monomer composition used and the physical properties desired but is generally about 0.1% by weight to about 10% by weight, or from about 0.1 to about 5% by weight, based on the total weight of the polymer.

Chain extending additives can also be added during melt processing to build molecular weight through 'reactive extrusion' or 'reactive chain coupling or any other process known in the art.

Chain extending agents useful in the invention can include, but are not limited to, copolymers of glycidyl methacrylate (GMA) with alkenes, copolymers of GMA with alkenes and acrylic esters, copolymers of GMA with alkenes and vinyl acetate, copolymers of GMA and styrene. Suitable alkenes comprise ethylene, propylene, and mixtures of two or more of the foregoing. Suitable acrylic esters comprise alkyl acrylate monomers, including, but not limited to, methyl acrylate, ethyl acrylate, propyl acrylate, butyl acrylate, and combinations of the foregoing alkyl acrylate monomers. When present, the acrylic ester can be used in an amount of 15 weight % to 35 weight %, based on the total amount of monomer used in the copolymer, or in any other range described herein. When present, vinyl acetate can be used in an amount of 4 weight % to 10 weight % based on the total amount of monomer used in the copolymer.

In certain embodiments, the chain extender comprises acrylic esters comprising monomers selected from alkyl acrylate monomers, including, but not limited to, methyl acrylate, ethyl acrylate, propyl acrylate, butyl acrylate, and combinations thereof. In embodiments, the chain extender is a copolymer comprising at least one acrylic ester and styrene.

Illustrative examples of suitable chain extending agents comprise ethylene-glycidyl acrylate copolymers, ethylene-glycidyl methacrylate copolymers, ethylene-glycidyl methacrylate-vinyl acetate copolymers, ethylene-glycidyl methacrylate-alkyl acrylate copolymers, ethylene-glycidyl methacrylate-methyl acrylate copolymers, ethylene-glycidyl methacrylate-ethyl acrylate copolymers, and ethylene-glycidyl methacrylate-butyl acrylate copolymers.

Examples of useful chain extending agents include but are not limited to Joncryl 4368, Joncryl™4468 (copolymers of glycidyl methacrylate with styrene), Joncryl™4368, Joncryl™4470, Joncryl™4370, Joncryl™ 4400, Joncryl™4300, Joncryl™4480, Joncryl™4380, Joncryl™4485, Joncryl™4385, and mixtures thereof commercially available from BASF Corporation, New Jersey.

In one embodiment, the chain extending agents can be styrene-acrylate copolymers with glycidyl groups. In another embodiment, the chain extending agent can be a copolymer of glycidyl methacrylate and styrene.

In one embodiment, the polymeric chain extending agent can have an average of greater than or equal to 2 pendant epoxy groups per molecule, greater than or equal to 3 pendant epoxy groups per molecule; or an average of greater than or equal to 4 pendant epoxy groups per molecule; or an average of greater than or equal to 5 pendant epoxy groups per molecule; or an average of greater than or equal to 6 pendant epoxy groups per molecule; or an average of greater than or equal to 7 pendant epoxy groups per molecule; or more specifically, an average of greater than or equal to 8 pendant epoxy groups per molecule, or, more specifically, an average of greater than or equal to 11 pendant epoxy groups per molecule, or, more specifically, an average of greater than or equal to 15 pendant epoxy groups per molecule, or, more specifically, an average of greater than or equal to 17 pendant epoxy groups per molecule. The lower limits of the number of pendant epoxy groups may be determined by one of ordinary skill in the art to apply to specific manufacturing conditions and/or to particular end-use applications. In certain embodiments, the chain extending agent can have from 2 to 20 pendant epoxy groups per molecule, or from 5 to 20 pendant epoxy groups per molecule, or from 2 to 15 pendant epoxy groups per molecule, or from 2 to 10 pendant epoxy groups per molecule, or from 2 to 8 pendant epoxy groups per molecule, or 3 to 20 pendant epoxy groups per molecule, or from 3 to 15 pendant epoxy groups per molecule, or from 5 to 15 pendant epoxy groups per molecule, or from 3 to 10 pendant epoxy groups per molecule, or from 5 to 10 pendant epoxy groups per molecule, or from 3 to 8 pendant groups per molecule, or from 3 to 7 pendant epoxy groups per molecule.

In certain aspects of the invention, the chain extending agent can be present (total loading) in the polymer composition of the invention in the amount of from 0.01 weight % to 5 weight %, or from 0.01 weight % to 4 weight %, or from 0.01 weight % to 3 weight %, or from 0.01 weight % to 2, weight % or from 0.01 weight % to 1 weight %, or from 0.10 weight % to 5 weight %, or from 0.10 weight % to 4 weight %, or from 0.10 weight % to 3 weight %, or from 0.10 weight % to 2 weight %, or from 0.10 weight to 1.5 weight %, or from 0.10 weight % to 1 weight, or from 0.25 weight % to 5 weight %, or from 0.25 weight % to 4 weight %, or from 0.25 weight % to 3 weight %, or from 0.25 weight % to 2 weight %, or from 0.25 weight to 1.5 weight %, or from 0.25 weight % to 1 weight, or from 0.25 weight % to 0.75 weight %, or from 0.50 weight % to 5 weight %, or from 0.50 weight % to 4 weight %, or from 0.50 weight % to 3 weight %, or from 0.50 weight % to 2 weight %, or from 0.50 weight to 1.5 weight %, or from 0.50 weight to 1.2 weight %, or from 0.50 weight % to 1 weight, based on the total weight of the polymer composition equaling 100 weight %. In certain embodiments, the chain extending agent can be present (total loading) in the polymer composition of the invention in the amount of from 0.25 weight % to 0.75 weight %, or from 0.30 weight % to 0.70 weight %, or from 0.4 weight % to 0.6 weight %.

In certain aspects of the invention, wherein at least one chain extending agent is present in an amount from 0.10 to 2.0 weight %, or from 0.10 to 1.50 weight %, or from 0.10 to 1.0 weight %, or from 0.25 to 0.75 weight %, based on the total weight percentage of the polymer composition equaling 100 weight %.

The initial amount of the chain extending agent used and order of addition will depend upon the specific chain extending agent chosen and the specific amounts of polyester employed.

In one embodiment, the weight ratio of chain extending agent to primary antioxidant present in the polymer compositions useful in the invention can be from 5:1 to 1:5. In certain aspects of the invention, the weight ratio of chain extending agent to primary antioxidant can be 3:1 or 2:1 or 1:1. In certain aspects of the invention, the weight ratio of chain extending agent to primary antioxidant is 2:1.

In certain aspects of the invention, the weight ratio of chain extending agent to secondary antioxidant present in the polymer compositions useful in the invention can be from 5:1 to 1:5. In certain aspects of the invention, the weight ratio of chain extending agent to primary antioxidant can be 3:1 or 2:1 or 1:1. In certain aspects of the invention, the weight ratio of chain extending agent to primary antioxidant is 2:1.

In one embodiment, there is provided a polymer composition wherein the weight ratio of chain extending agent to total antioxidant (primary and secondary) is from is from 0.25 to 2.0, or from 0.25-1.75, or from 0.25 to 1.50, or from 0.50 to 2.0, or from 0.50-1.50, or from 0.75-1.25, or from 0.80-1.2, or from 0.80-1.5, or from 0.90-1.10, or from 0.90-1.10, or from 1:1.

In one embodiment, there is provided a polymer composition wherein at least one phenolic antioxidant is pentaerythritol tetrakis[3-(3,5-di-t-butyl-4-hydroxyphenyl)propionate, at least one phosphite is tris(2,4-di-tert-butylphenyl)phosphite, and at least one chain extending agent is a copolymer of glycidyl methacrylate with styrene.

In one embodiment, there is provided a polymer composition wherein at least one of the ultraviolet light absorbing agents is selected from triazines, cyanoacrylates, benzotriazoles, naphthalenes, benzophenones, and benzoxazine-4-ones, or combinations thereof.

In one embodiment, there is provided a polymer composition wherein wherein at least one ultraviolet light absorbing agent is selected from triazines.

In one embodiment, there is provided a polymer composition wherein at least one ultraviolet light absorbing agent is selected from the following: 2,4-cis(2,4-dimethylphenyl)-6-(2-hydroxy-4-isooctyloxyphenyl)-1,3,5-triazine (CAS #2725-22-62), known as Cyasorb 1164 commercially available from Solvay; 2,4,6-diphenyl-1,3,5-triazin-2-yl)-5-[(hexyl)oxy]-phenol] (CAS #147315-50-2), known as Tinuvin™ 1577 commercially available from BASF); or 6-[4,6-bis(4-phenylphenyl)-1H-1,3,5-triazin-2-ylidene]-3-(2-ethylhexoxy)cyclohexa-2,4-dien-1-one) (CAS #204583-39-1) known as Tinuvin™ 1600 commercially available from BASF, or mixtures thereof.

In one embodiment, there is provided a polymer composition wherein wherein the total weight ratio of ultraviolet light absorbing agent to the total weight of primary and secondary antioxidant is from 10:0.25, or from 8.0:0.25, or from 6.0:0.25, or from 3.0:0.25, or from 10:0.25, or from 8.0:0.25, or from 6.0:0.25, or from 3.0:0.25, or from 10:0.50, or from 8.0:0.50, or from 6.0:0.50, or from 3.0:0.50, or from 10:0.50, or from 8.0:0.50, or from 6.0:0.50, or from 3.0:0.50.

In one embodiment, there is provided a polymer composition wherein wherein the total weight ratio of ultraviolet light absorbing agent to chain extender is from 10:0.25, or from 8.0:0.25, or from 6.0:0.25, or from 3.0:0.25, or from 10:0.25, or from 8.0:0.25, or from 6.0:0.25, or from 3.0:0.25, or from 10:0.50, or from 8.0:0.50, or from 6.0:0.50, or from 3.0:0.50, or from 10:0.50, or from 8.0:0.50, or from 6.0:0.50, or from 3.0:0.50.

In one embodiment, there is provided a polymer composition wherein wherein at least one hindered amine light stabilizer comprises the following structure:

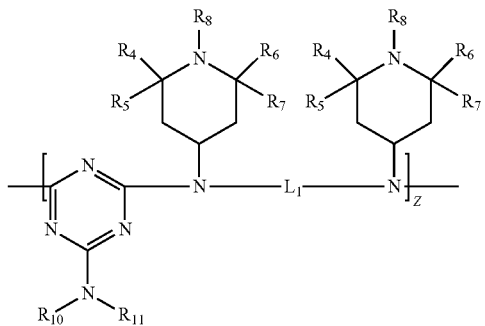

wherein $R_4=R_5=R_6=R_7=R_8$=methyl, $(R_{10})(R_{11})N$— collectively represent morpholino, $L_1$ is hexamethylene, and Z is 1 to 6.

In one embodiment, there is provided a polymer composition wherein at least one hindered amine light stabilizer is selected from at least one of 1,6-hexanediamine N,N'-bis(2,2,6,6-tetramethyl-4-piperidinyl)(CAS #565450-39-7, known as Tinuvin Nor™371-FF, commercially available from BASE; or polymers with morpholine-2,4,6-trichloro1,3,5-triazine (CAS #193098-40-7); known as Cyasorb™ 3529 commercially available from Solvay.

In one embodiment, there is provided a polymer composition wherein the hindered amine light stabilizer is present in an amount from 0.10 weight % to 2.0 weight %, based on the total weight of the polymer composition equaling 100 weight %.

In one embodiment, there is provided a polymer composition wherein wherein the weight ratio of ultraviolet light absorbing agent to the hindered amine light stabilizer is from 10:0.25, or from 8.0:0.25, or from 6.0:0.25, or from 3.0:0.25, or from 10:0.25, or from 8.0:0.25, or from 6.0:0.25, or from 3.0:0.25, or from 10:0.50, or from 8.0:0.50, or from 6.0:0.50, or from 3.0:0.50, or from 10:0.50, or from 8.0:0.50, or from 6.0:0.50, or from 3.0:0.50.

In one embodiment, there is provided a polymer composition wherein wherein: (1) at least one phenolic antioxidant is pentaerythritol tetrakis[3-(3,5-di-t-butyl-4-hydroxyphenyl)propionate; (2) at least one phosphite is tris(2,4-di-tert-butylphenyl)phosphite; (3) at least one chain extending agent is a copolymer of glycidyl methacrylate with styrene; (4) at least one ultraviolet light absorbing agent is a triazine; and (5) at least one hindered amine light stabilizer is either 1,6-hexanediamine N, N-bis(2,2,6,6-tetramethyl-4-piperidinyl)(CAS #565450-39-7) or polymers with morpholine-2,4,6-trichloro1,3,5-triazine (CAS #193098-40-7); known as Cyasorb™ 3529 commercially available from Solvay, or mixtures thereof.

In one embodiment, there is provided a polymer composition comprising: (1) at least one phenolic antioxidant in the amount of from 0.10 weight % to 2.0 weight %, (2) at least one phosphite in the amount of from 0.10 weight % to 2.0 weight %, (3) at least one chain extending agent in the amount of from 0.10 weight % to 2.0 weight %, (4) at least one ultraviolet light absorber in the amount of 0.10 to 3.0 weight %, and (5) at least one hindered amine light stabilizer in an amount from 0.10 weight % to 2.0 weight %, based on the total weight of the polymer composition equaling 100 weight %.

In one embodiment, there is provided a polymer composition wherein the polymer composition the polymer composition comprises: (1) at least one phenolic antioxidant in the amount of from 0.10 weight % to 2.0 weight %, (2) at least one phosphite in the amount of from 0.10 weight % to 2.0 weight %, (3) at least one chain extending agent in the amount of from 0.10 weight % to 2.0 weight %, (4) at least one ultraviolet light absorber in the amount of 0.10 to 3.0 weight %, and (5) at least one hindered amine light stabilizer in an amount from 0.10 weight % to 2.0 weight %, based on the total weight of the polymer composition equaling 100 weight %.

In one embodiment, there is provided a polymer composition wherein the Δb* value for said polymer composition is less than 10, or less than 5, or less than 3, or less than 2, or less than 1, or from 10 to −10 or from 5 to −10, or from 3 to −10, or from 2 to −10, or from 1 to −10, according to the L*, a* and b* color system of the CIE (International Commission on Illumination), when exposed for from 1000 hours to 4000 hours to ASTM Test Method G155 in a xenon arc Atlas Ci4000 Weather-Ometer using an irradiation of 0.35 W/m² at 340 nm, inner and outer borosilicate filters, 55% relative humidity, a black panel temperature of 63° C., a chamber temperature of 52° C., and a cycle consisting of all light with 18 minutes of water spray for every 2 hours irradiation.

In one embodiment, there is provided a polymer composition wherein the Δb* value for said polymer composition is less than 2.

In one embodiment, there is provided a polymer composition wherein the ΔE* value for said polymer composition is less than 10, or less than 5, or less than 3, or less than 2, or less than 1, or from 0 to 10 or from 0 to 10, or 0 to 9, or 0 to 8.5, or 0 to 5, or 0 to 2.5, according to the L*, a* and b* color system of the CIE (International Commission on Illumination) after being exposed for at least 200 hours, or at least 600 hours to ASTM Test Method G155 in a xenon arc Atlas Ci4000 Weather-Ometer using an irradiation of 0.35 W/m² at 340 nm, inner and outer borosilicate filters, 55% relative humidity, a black panel temperature of 63° C., a chamber temperature of 52° C., and a cycle consisting of all light with 18 minutes of water spray for every 2 hours irradiation.

In one embodiment, there is provided a polymer composition wherein the ΔE* value for said polymer composition is less than 10.

In one embodiment, there is provided a polymer composition wherein the flatwise impact strength according to ASTM Method D6395 was 60 to 80 kJ/m² when exposed from 0 to 1600 hours.

In one embodiment, the invention relates to a method for stabilizing any of the thermoplastic polymers useful in the invention comprising the incorporation into a polymer an effective stabilizing amount of the stabilizer composition(s) of the invention.

For certain aspects of the invention, the polymer composition can have improved properties, for example, for color stability, weatherability, and/or impact strength.

The weight percentages specified herein can also be combined with the ratios of additives to each other that are specified. They can also be combined with the particular classifications of additives that are described herein. The weight ratios of one additive to another or weight percentages of additives are calculated based on the weight of the additive compared to the total weight of the polymer composition at the time of loading the additive into the composition (total loading) wherein all components equal 100 weight %.

In one embodiment, the stabilizer compositions useful in the invention can improve or maintain color, reduce the loss of number average molecular weight, and/or inherent viscosity, and/or reduce the total number of carboxyl end groups, under the conditions as specified herein.

These combinations of UV absorber, primary antioxidant, secondary antioxidant, hindered amine light stabilizer, and chain extending agent useful in the present invention have been shown herein to be effective in certain polymers, for example polycondensation polymers, e.g. polyester and copolyester classes of polymers. The improved weathering, UV resistance and thermal oxidative and hydrolytic stability can be measured by any method known in the art, for example, through using gel-permeation chromatography and through visual color observations, colorimeter, and/or spectrophotometry. Viscosity improvements can be measured by any method known in the art, for example, using parallel plate rheometry or inherent viscosity measures. Numbers of carboxyl end groups can be measured by titration.

To make stabilized compositions, blends of these UV absorbers, antioxidants, hindered amine light stabilizers, and chain extending agent and polyesters and copolyesters can either be prepared directly during the polymerization process or compounded to produce pellets using typical plastics compounding and extrusion techniques. These fully compounded or prepared pellets can be processed using conventional polymer processing methods, or concentrates of the above additives can be prepared and diluted with neat polyesters and copolyesters, to make sheet, film, injection molded articles, and blow molded articles, using conventional thermoplastic processing methods. To make stabilized compositions, blends of these UV absorbers antioxidants, and hindered amine light stabilizers, chain extending agent and polyesters and copolyesters can either be prepared directly during the polymerization process or compounded to produce pellets using typical plastics compounding and extrusion techniques. To make powders that are useful for 3D printing applications or powder coating of metals, the compounded pellets can be subsequently ground and reduced in size at cryogenic temperatures.

In some embodiments of the invention, the polymer compositions of the invention and/or the polymer blends of the invention exclude: (1) polycarbonate; (2) bisphenol A polycarbonates; (3) blends of polycarbonate and poly(butylene) terephthalate (PBT); (4) poly(butylene) terephthalate or polyesters containing butanediol; (5) terephthalate based polyesters containing butanediol and bisphenol A polycarbonates; (6) poly(arylene) ethers; (7) cellulose esters; (8) polypropylene; (9) PET homopolymer; (10) carbon nanotubes; and/or (11) polyphosphates.

In one embodiment, certain additional polymers other than the ones described in the polymer compositions of the invention, e.g., polycarbonate, can be present in an amount of 50 weight % or less, or 40 weight % or less, or 30 weight % or less, or 20 weight % or less, or 10 weight % or less, or 5 weight % or less; in another embodiment, 0.01 to 50 weight %, or 1 to 50 weight %, or 5 to 50 weight %, or 0.01 to 40 weight %, or 0.01 to 30 weight % or 0.01 to 20 weight %, or 0.01 to 10 weight % or 0.01 to 5 weight %, based on the total weight of the composition equaling 100 weight %.

In certain embodiments, the polymer compositions of the invention can comprise a polymer blend of at least one polymer described herein and at least one other polymer. In embodiments, the polymer blend comprises at least one condensation polymer and the stabilizer composition (as described herein) and at least one other polymer selected from liquid crystalline polyesters/amides/imides, polyesteramides, polyimides, polyetherimides, polyurethanes, polyureas, polybenzimidazole, polybenzoxazoles, polyimines, polycarbonates, other polyesters, other copolyesters, and polyamides. In one embodiment, the polymer blend does not include polycarbonate. In one embodiment, the polymer blend does not include bisphenol polycarbonate. In one embodiment, the polymer blend does not include polybutylene terephthalate. In one embodiment, the polymer blend does not include polyarylene ethers. In one embodiment, the polymer blend does not include cellulose esters.

In certain embodiments for the polymer blend, the at least one other polymer is present in the blend in the amount of 50 weight % or less, or 40 weight % or less, or 30 weight % or less, or 20 weight % or less, or 10 weight % or less, or 5 weight % or less, based on the total weight of the blend equaling 100 weight %. In embodiments, the at least one other polymer is present in the polymer blend in the amount of 0.01 to 50 weight %, or 1 to 50 weight %, or 5 to 50 weight %, or 0.01 to 40 weight %, or 0.01 to 30 weight % or 0.01 to 20 weight %, or 0.01 to 10 weight % or 0.01 to 5 weight %, based on the total weight of the blend equaling 100 weight %.

In embodiments, the polymer compositions described herein do not contain carbon nanotubes.

An effective amount of the stabilizing composition can be determined by understanding fitness for use requirements, target properties and/or target criteria for various applications and/or thermoplastic processing conditions and/or when the chosen property is preserved during processing.

For the purposes of this invention, "aging" refers to any standard known to one of ordinary skill in the art, and alternatively, is defined as being heated for at least three hours at 200° C. or as being heated for at least twenty-four hours at 175° C.

In one embodiment, the polymers or polymer blends useful in the invention and/or the polymer compositions of the invention, with or without toners, can have color values L*, a* and b* which can be determined using a Macbeth Spectrophotometer in transmission mode. The color determinations are averages of values measured on either pellets, or powders or particles less in size than 300 microns, of the polymers or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate, as determined by the L*a*b* color system measured following ASTM D 6290-98 and ASTM E308-99.

Unless stated otherwise herein, the color values for this application were measured using 3 mm injection molded plaques. The color was measured using a Macbeth Spectrophotometer in transmission mode, as determined by the L*a*b* color system measured following ASTM D 6290-98 and ASTM E308-99.

In embodiments, polymer compositions can be provided that have small changes in color and/or yellowness when exposed to UV light for 1000 hours or 1500 hours. In embodiments, the polymer compositions (as described herein) can have a change in color ($\Delta E^*$) of less than 10 or less than 5, measured according to ASTM D2244, after exposure to UV light having a wavelength of 100 to 400 nm, or 100 to 200 nm, or 200 to 300 nm, or 300 to 400 nm, for 1000 hours or 1500 hours. In embodiments, the polymer compositions (as described herein) can have a change in yellowness ($\Delta b^*$) of less than 10 or less than 5, measured according to ASTM D2244, after exposure to UV light having a wavelength of 100 to 400 nm, or 100 to 200 nm, or 200 to 300 nm, or 300 to 400 nm, for 1000 hours or 1500 hours.

In certain embodiments, the initial b* color values and/or $\Delta b^*$ color values for the polymers useful in the invention, with or without the presence of dyes/colorants, can be present in one of the following ranges: −10 to 10; −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2.

The $\Delta b^*$ color values for the polymers useful in the invention can be present in one of the following ranges: less than 10, or less than 9, or less than 8, or less than 7, or less than 6, or less than 5, or less than 4, or less than 3, or less than 2, or less than 1, according to the L*, a* and b* color system of the CIE (International Commission on Illumination) when exposed for from 1000 hours to 4000 hours to ASTM Test Method G155 in a xenon arc Atlas Ci4000 Weather-Ometer using an irradiation of 0.35 W/m$^2$ at 340 nm, inner and outer borosilicate filters, 55% relative humidity, a black panel temperature of 6300, a chamber temperature of 52° C., and a cycle consisting of all light with 18 minutes of water spray for every 2 hours irradiation.

In one embodiment, the initial b* color value for the polymers useful in the invention is less than 5 and the $\Delta b^*$ color value is less than 5 of said polymer composition.

In one embodiment, the initial b* color value for the polymers useful in the invention and the $\Delta b^*$ color value of said polymer composition is less than 10, or less than 9, or less than 8, or less than 7, or less than 6, or less than 5, or less than 4, or less than 3, or less than 2, or less than 1.

In one embodiment, there is provided a polymer composition wherein the $\Delta b^*$ value for said polymer composition is less than 10, or less than 5, or less than 3, or less than 2, or less than 1, or from 10 to −10 or from 5 to −10, or from 3 to −10, or from 2 to −10, or from 1 to −10, according to the L*, a* and b* color system of the CIE (International Commission on Illumination), when exposed for from 1000 hours to 4000 hours to ASTM Test Method G155 in a xenon arc Atlas Ci4000 Weather-Ometer using an irradiation of 0.35 W/m$^2$ at 340 nm, inner and outer borosilicate filters, 55% relative humidity, a black panel temperature of 63° C., a chamber temperature of 52° C., and a cycle consisting of all light with 18 minutes of water spray for every 2 hours irradiation.

In one embodiment, there is provided a polymer composition wherein the $\Delta b^*$ value for said polymer composition is less than 2.

In one embodiment, there is provided a polymer composition wherein the $\Delta E^*$ value for the polymer composition as measured by ASTM D2244 is less than 10, or less than 5, or less than 3, or less than 2, or less than 1, or from 0 to 10 or from 0 to 10, or 0 to 9, or 0 to 8.5, or 0 to 5, or 0 to 2.5, according to the L*, a* and b* color system of the CIE (International Commission on Illumination) after being exposed for at least 200 hours, or at least 600 hours to ASTM Test Method G155 in a xenon arc Atlas Ci4000 Weather-Ometer using an irradiation of 0.35 W/m$^2$ at 340 nm, inner and outer borosilicate filters, 55% relative humidity, a black panel temperature of 63° C., a chamber temperature of 52° C., and a cycle consisting of all light with 18 minutes of water spray for every 2 hours irradiation.

In one embodiment, there is provided a polymer composition wherein the $\Delta E^*$ value for said polymer composition as measured by ASTM D2244 is less than 10.

In embodiments, polymer compositions can be provided that have small changes in (flatwise) impact strength when exposed to UV light for 1000 hours or 1500 hours. In embodiments, the polymer compositions (as described herein) can have a change (e.g., loss) in flatwise impact strength of less than 10% or less than 5%, measured according to ASTM D6395, after exposure to UV light having a wavelength of 100 to 400 nm, or 100 to 200 nm, or 200 to 300 nm, or 300 to 400 nm, for 1000 hours or 1500 hours.

In one embodiment, there is provided a polymer composition wherein the flatwise impact strength according to ASTM Method D6395 was 60 to 80 kJ/m$^2$ when exposed from 0 to 1600 hours.

The methods of forming the polymers into articles of manufacture, fibers, films, molded articles, containers, and sheeting are well known in the art. The polyester compositions are useful in articles of manufacture including, but not limited to, fibers, filaments, films, sheets, containers, extruded, calendered, and/or molded articles including, but not limited to, injection molded articles, extruded articles, cast extrusion articles, profile extrusion articles, melt spun articles, thermoformed articles, extrusion molded articles, injection blow molded articles, injection stretch blow molded articles, extrusion blow molded articles and extrusion stretch blow molded articles. The polyester compositions useful in the invention may be used in various types of film and/or sheet, including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting. The polymer compositions and/or polymer blend compositions can be useful in forming fibers, films, light diffusing articles, light diffusing sheets, light reflecting articles, light reflecting sheets, light emitting diodes, 3D powders or other materials, 3D articles containing powders or other materials. The extruded sheet can be further modified using typical fabrication techniques such as thermoforming, cold bending, hot bending, adhesive bonding, cutting, drilling, laser cutting, etc. to create shapes useful for application as light reflectors and/or light diffusers.

As used herein, the abbreviation "wt" means "weight". The inherent viscosity of the polymers, for example, the polyesters was determined in 60/40 (wt/wt) phenol/tetrachloroethane at a concentration of 0.5 g/100 ml at 25° C.

The following examples further illustrate how the compositions of matter of the invention can be made and evaluated, and are intended to be purely exemplary of the invention and are not intended to limit the scope thereof. Unless indicated otherwise, parts are parts by weight, temperature is in degrees C. or is at room temperature, loading level is measured in units of weight percentage based on the total weight of the initial polymer composition equaling 100 weight %; and pressure is at or near atmospheric.

It can be clearly seen from a comparison of the data in the above relevant working examples that the combination of the UV absorber, primary antioxidants, secondary antioxidants, hindered amine light stabilizers, and chain extending agents useful in the invention within a certain loading level can improved weathering, UV resistance, oxidative stability, color and flow of the certain polymers.

EXAMPLES

The following tables and figures summarize experimental results of the invention and counterexamples:

TABLE 1

Formulations*

| Ingredient | Functionality | Example Number | | | | | | | |
| --- | --- | --- | --- | --- | --- | --- | --- | --- | --- |
| | | 1 | 2 | 3 | 4 | 5 | 6 | 7 | 8 |
| Polyester 1 | Base Resin | 97 | 97 | 95.5 | 95.5 | 97 | 97 | 95.5 | 95.5 |
| Cyasorb ™ 1164 | UVA-Triazine | 1.5 | | 3 | | 1.5 | | 3 | |
| Tinuvin ™ 1600 | UVA-Triazine | | 1.5 | | 3 | | 1.5 | | 3 |
| Irganox ™ 1010 | Primary AO | 0.25 | 0.25 | 0.25 | 0.25 | 0.25 | 0.25 | 0.25 | 0.25 |
| Irgafo ™s 168 | Secondary AO | 0.25 | 0.25 | 0.25 | 0.25 | 0.25 | 0.25 | 0.25 | 0.25 |
| Cyasorb ™ 3529 | HALS | 0.5 | 0.5 | 0.5 | 0.5 | 0.25 | 0.25 | 0.25 | 0.25 |
| Nor 371-FF ™ | Nor-HALS | | | | | 0.25 | 0.25 | 0.25 | 0.25 |
| Joncryl 4468 ™ | Chain Extender | 0.5 | 0.5 | 0.5 | 0.5 | 0.5 | 0.5 | 0.5 | 0.5 |

*Except for example numbers in Table 1, the numerical values are weight percentages of the components of the formulations where the total weight percentages for the final formulation equals 100 weight percent.

TABLE 2

Comparative Formulations (active ingredients are 1/10 of the amounts shown below)

| Ingredient | Functionality | Example Number | | | | | | | | | | |
| --- | --- | --- | --- | --- | --- | --- | --- | --- | --- | --- | --- | --- |
| | | 9 | 10 | 11 | 12 | 13 | 14 | 15 | 16 | 17 | 18 | 19 |
| Polyester 2 | Base Resin | 100 | 97.5 | 95 | 92.5 | 87.5 | 90 | 85 | 97.5 | 95 | 90 | 95 |
| Cyasorb ™ 1164 | UVA-Triazine 10% Concentrate | 0 | 0 | 0 | 0 | 0 | 0 | 0 | 0 | 0 | 0 | 5 |

TABLE 2-continued

Comparative Formulations (active ingredients are 1/10 of the amounts shown below)

| Ingredient | Functionality | Example Number | | | | | | | | | |
|---|---|---|---|---|---|---|---|---|---|---|---|
| | | 9 | 10 | 11 | 12 | 13 | 14 | 15 | 16 | 17 | 18 | 19 |
| Cyasorb 3638 ™ | UVA-Benzoxazinone-10% Concentrate | 0 | 2.5 | 5 | 2.5 | 2.5 | 5 | 5 | 0 | 0 | 0 | 0 |
| Cyasorb 3529 | HALS-10% Concentrate | 0 | 0 | 0 | 5 | 10 | 5 | 10 | 2.5 | 5 | 10 | 0 |

*Except for example numbers described in Table 2, the numerical values are weight percentages of the components of the formulations where the total weight percentages for the final formulation equals 100 weight percent.

The samples in Table 1 were made by combining the additives and the base resin, Polyester 1 (23 mole % 2,2,4,4-tetramethyl-1,3-cyclobutanediol residues, 77 mole % 1,4-cyclohexanedimethanol residues, 100 mole % terephthalic acid residues, based on 100 mole % total diacid residues and 100 mole % total diol residues, having an inherent viscosity of 0.72 dL/g), on a 23 mm twin screw compounding extruded to make pellets. These pellets were then injection molded into 4"×4"×0.125" plaques.

The samples in Table 2 were made by combining concentrates of typical UV absorbers and HALS at 10% loading of each additive with the base resin, Polyester 2 (same as Polyester 1 except for 28 mole % 2,2,4,4-tetramethyl-1,3-cyclobutanediol residues, 72 mole % 1,4-cyclohexanedimethanol residues, and less than 1.5 mole % (0.25 weight %) of branching agent (trimellitic anhydride) residues with the remainder of the diacid residues being terephthalic acid residues, and having an inherent viscosity of 0.64 dL/g). These mixtures were then extruded into 0.040" thick films on a 1.5" Killion single screw extruder.

Xenon Arc Accelerated Weathering Method—weathering was evaluated using an Atlas Ci4000 xenon arc accelerated weathering device according to the ASTM G 155 test method using borosilicate inner and outer filters, an irradiance of 0.35 W/m2/nm at 340 nm, a black panel temperature of 63° C., a chamber temperature of 52° C., a relative humidity of 55%, and a cycle consisting of all light with 18 minutes of water spray every 2 hours. In addition, the Ci65 machine controls the black panel temperature during the spray cycle. This weathering method was applied to all of the Examples with the time of exposure noted in hours.

Physical Property Testing—Samples were removed periodically and tested for color difference (Δb*) and total color change (ΔE*) (ASTM D2244), and flatwise impact strength (FWIS) (ASTM D6395) for the Examples in Table 1 and Instrumented Impact (ASTM D3763) for the samples in Table 2.

Examples 1-8—Property Testing for Formulations in Table 1

Property Test 1—Change in b* (Δb*)—Table 3 shows results for Δb* (yellowness/blueness) as measured by ASTM D2244 for the formulations of Table 1 (Examples 1-8) with UV absorber, primary and secondary anti-oxidants, HALS and Nor-HALs and chain extender. FIG. 1 also illustrates this data. The results for the polymer compositions shown in Table 3 and of FIG. 1 show an initial drop in Δb* indicative of a bleaching effect from the light source in the Xenon Arc causing the samples to go slightly bluer. The results for polymer compositions shown in Examples 5 to 8 of Table 3 and FIG. 1 show a much greater drop in Δb* indicative of a bleaching effect from the light source in the Xenon Arc causing the samples to go much bluer. This can be attributable the NOR-371 FF™ Nor-HALS being extremely yellow initially, much yellower than Cyasorb™ 3529 HALS. Once all the samples reach approximately 1000 hours of exposure, the change in b* (Δb*) is minimal showing very good resistance to UV degradation.

Figure 2:
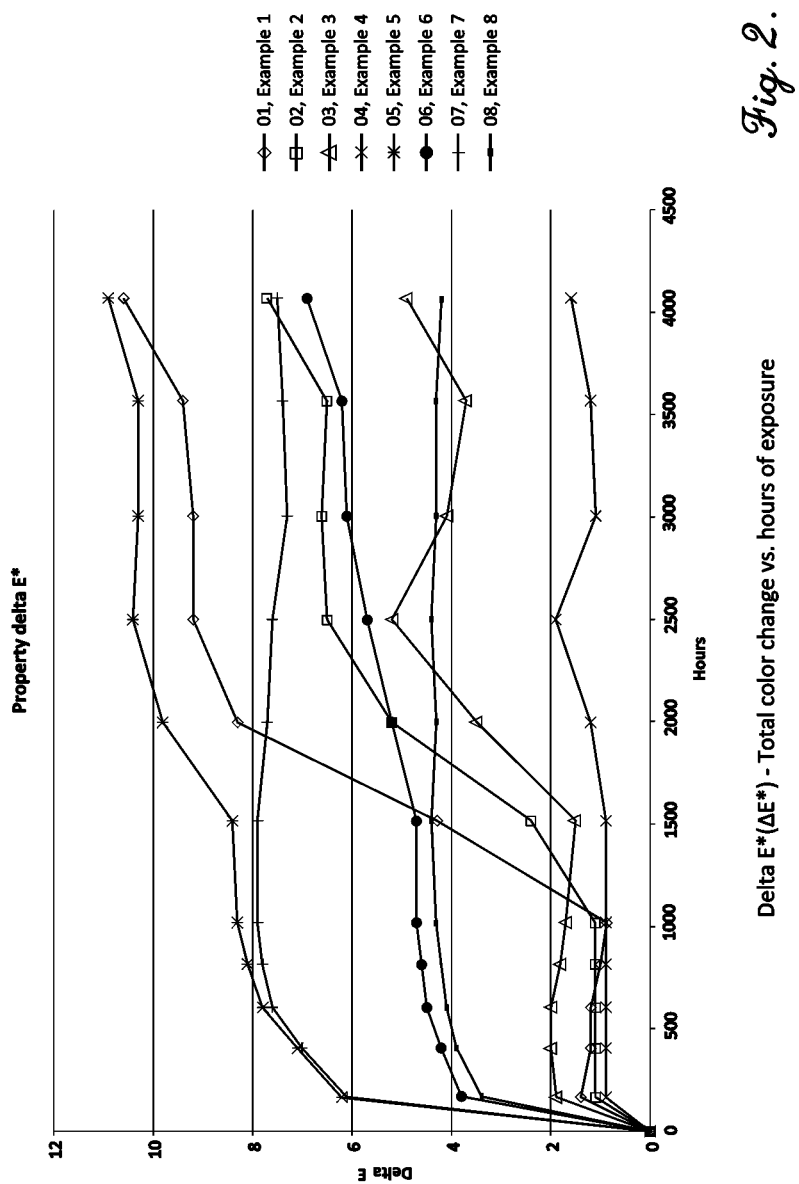
FIG. 2: The graph in FIG. 2 shows the effect on total color change, ΔE* value, at different levels of primary antioxidant (for example, Irganox™ 1010 antioxidant), secondary antioxidant (for example, Irgafos™ 168 antioxidant), chain extending agent (for example, Joncryl™4468 additive), ultraviolet light stabilizer (for example, (Cyasorb™1164 or Tinuvin™1600), and hindered amine light stabilizer (Cyasorb™ 3529), for Polyester 1 as described in Table 1.

Property Test 2—Total Color Change—ΔE*—Table 3 shows results for total color change, ΔE* for the formulations of Table 1 (Examples 1-8), as measured by ASTM 02244 for formulations with UV absorber, primary and secondary anti-oxidants, HALS and Nor-HALs and chain extender. FIG. 2 also illustrates this data. The results for Examples 1 to 4 of Table 3 and FIG. 2 show that at about 200 hours of exposure the total color change is below 2 units and has stabilized, indicating very little color change. The results for Examples 5 to 8 are shown in Table 3 and FIG. 2 which show the color change not stabilizing until about 600 hours. This is attributable to the bleaching effect that is making the samples bluer as also shown in Table 3 and FIG. 2.

TABLE 3

| Example Number | Exposure Hours | Δb*Value | ΔE*Value |
|---|---|---|---|
| Example 1 | 0 | 0 | 0 |
| Example 1 | 166 | −1.3 | 1.4 |
| Example 1 | 405 | −1.2 | 1.2 |
| Example 1 | 605 | −1.1 | 1.2 |
| Example 1 | 818 | −1 | 1 |
| Example 1 | 1018 | −0.8 | 0.9 |
| Example 1 | 1518 | −0.7 | 4.3 |
| Example 1 | 1998 | −0.4 | 8.3 |
| Example 1 | 2500 | −0.2 | 9.2 |
| Example 1 | 3002 | 0 | 9.2 |
| Example 1 | 3567 | 0.4 | 9.4 |
| Example 1 | 4067 | 0.6 | 10.6 |
| Example 2 | 0 | 0 | 0 |
| Example 2 | 166 | −1.1 | 1.1 |
| Example 2 | 405 | −1.1 | 1.1 |
| Example 2 | 605 | −1.1 | 1.1 |
| Example 2 | 818 | −1 | 1.1 |
| Example 2 | 1018 | −1 | 1.1 |
| Example 2 | 1518 | −1 | 2.4 |
| Example 2 | 1998 | −0.9 | 5.2 |
| Example 2 | 2500 | −0.9 | 6.5 |
| Example 2 | 3002 | −0.9 | 6.6 |
| Example 2 | 3567 | −0.8 | 6.5 |
| Example 2 | 4067 | −0.7 | 7.7 |
| Example 3 | 0 | 0 | 0 |
| Example 3 | 166 | −1.8 | 1.9 |
| Example 3 | 405 | −1.8 | 2 |
| Example 3 | 605 | −1.8 | 2 |
| Example 3 | 818 | −1.7 | 1.8 |
| Example 3 | 1018 | −1.7 | 1.7 |
| Example 3 | 1518 | −1.5 | 1.5 |
| Example 3 | 1998 | −1.2 | 3.5 |
| Example 3 | 2500 | −1 | 5.2 |

TABLE 3-continued

| Example Number | Exposure Hours | Δb*Value | ΔE*Value |
|---|---|---|---|
| Example 3 | 3002 | −0.5 | 4.1 |
| Example 3 | 3567 | −0.1 | 3.7 |
| Example 3 | 4067 | 0 | 4.9 |
| Example 4 | 0 | 0 | 0 |
| Example 4 | 166 | −0.9 | 0.9 |
| Example 4 | 405 | −0.9 | 0.9 |
| Example 4 | 605 | −0.9 | 0.9 |
| Example 4 | 818 | −0.8 | 0.9 |
| Example 4 | 1018 | −0.9 | 0.9 |
| Example 4 | 1518 | −0.8 | 0.9 |
| Example 4 | 1998 | −0.8 | 1.2 |
| Example 4 | 2500 | −0.7 | 1.9 |
| Example 4 | 3002 | −0.7 | 1.1 |
| Example 4 | 3567 | −0.6 | 1.2 |
| Example 4 | 4067 | −0.5 | 1.6 |
| Example 5 | 0 | 0 | 0 |
| Example 5 | 166 | −6 | 6.2 |
| Example 5 | 405 | −6.9 | 7.1 |
| Example 5 | 605 | −7.6 | 7.8 |
| Example 5 | 818 | −7.9 | 8.1 |
| Example 5 | 1018 | −8 | 8.3 |
| Example 5 | 1518 | −8.2 | 8.4 |
| Example 5 | 1998 | −8.3 | 9.8 |
| Example 5 | 2500 | −8.3 | 10.4 |
| Example 5 | 3002 | −8.2 | 10.3 |
| Example 5 | 3567 | −8 | 10.3 |
| Example 5 | 4067 | −7.8 | 10.9 |
| Example 6 | 0 | 0 | 0 |
| Example 6 | 166 | −3.7 | 3.8 |
| Example 6 | 405 | −4.1 | 4.2 |
| Example 6 | 605 | −4.4 | 4.5 |
| Example 6 | 818 | −4.5 | 4.6 |
| Example 6 | 1018 | −4.6 | 4.7 |
| Example 6 | 1518 | −4.7 | 4.7 |
| Example 6 | 1998 | −4.8 | 5.2 |
| Example 6 | 2500 | −4.8 | 5.7 |
| Example 6 | 3002 | −4.8 | 6.1 |
| Example 6 | 3567 | −4.7 | 6.2 |
| Example 6 | 4067 | −4.7 | 6.9 |
| Example 7 | 0 | 0 | 0 |
| Example 7 | 166 | −5.7 | 6.1 |
| Example 7 | 405 | −6.7 | 7 |
| Example 7 | 605 | −7.2 | 7.6 |
| Example 7 | 818 | −7.4 | 7.8 |
| Example 7 | 1018 | −7.6 | 7.9 |
| Example 7 | 1518 | −7.7 | 7.9 |
| Example 7 | 1998 | −7.6 | 7.7 |
| Example 7 | 2500 | −7.6 | 7.6 |
| Example 7 | 3002 | −7.3 | 7.3 |
| Example 7 | 3567 | −7.3 | 7.4 |
| Example 7 | 4067 | −7.1 | 7.5 |
| Example 8 | 0 | 0 | 0 |
| Example 8 | 166 | −3.3 | 3.4 |
| Example 8 | 405 | −3.8 | 3.9 |
| Example 8 | 605 | −4 | 4.1 |
| Example 8 | 818 | −4.1 | 4.2 |
| Example 8 | 1018 | −4.3 | 4.3 |
| Example 8 | 1518 | −4.3 | 4.4 |
| Example 8 | 1998 | −4.3 | 4.3 |
| Example 8 | 2500 | −4.4 | 4.4 |
| Example 8 | 3002 | −4.3 | 4.3 |
| Example 8 | 3567 | −4.2 | 4.3 |
| Example 8 | 4067 | −4.2 | 4.2 |

Figure 3:
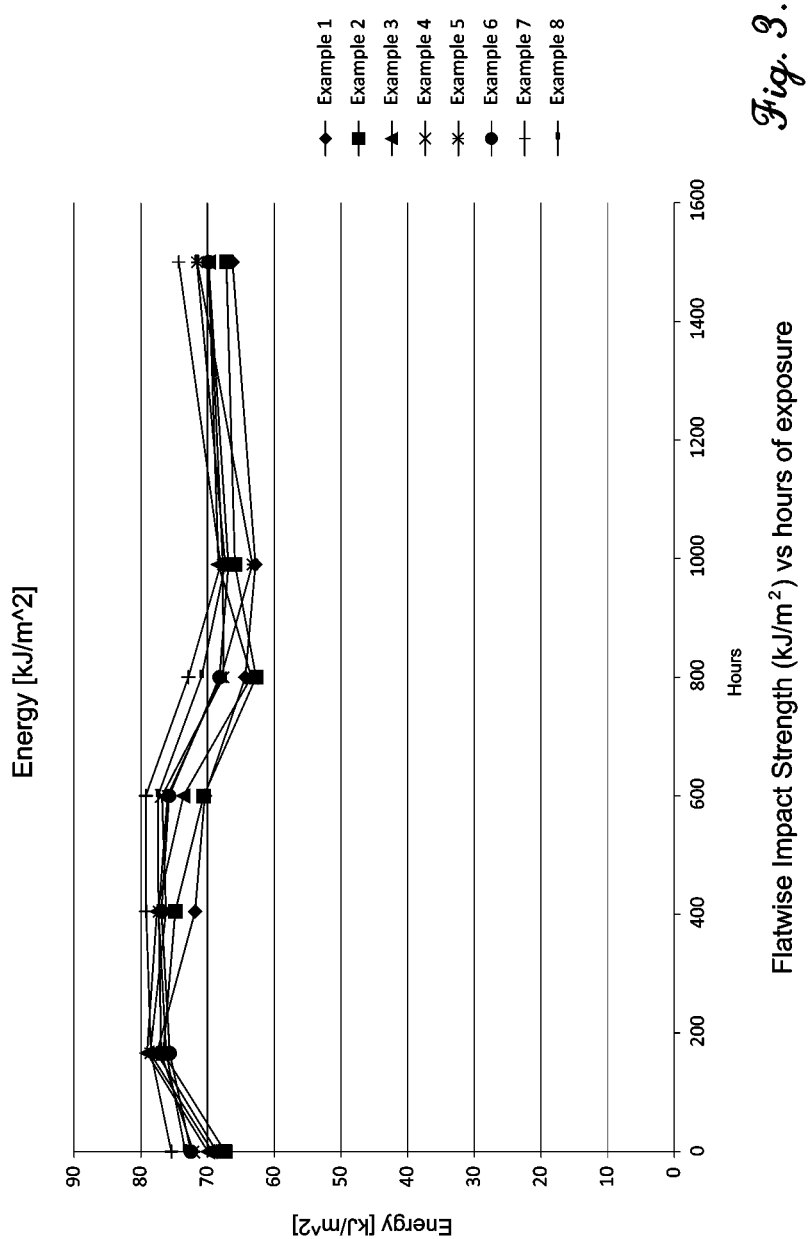
FIG. 3: The graph in FIG. 3 shows the flatwise impact strength at different levels of primary antioxidant (for example, Irganox™1010 antioxidant), secondary antioxidant (for example, Irgafos™ 168 antioxidant), chain extending agent (for example, Joncryl™4468 additive), ultraviolet light stabilizer (for example, (Cyasorb™1164 or Tinuvin™1600), and hindered amine light stabilizer (Cyasorb™ 3529), for Polyester 1 as described in Table 1.

Property 3—Flatwise Impact Strength ($kJ/m^2$)—Table 4 shows flatwise impact strength values as measured by ASTM 06395 for the formulations of Table 1 (Examples 1-8), formulations with UV absorber, primary and secondary anti-oxidants, HALS and Nor-HALs and chain extender. FIG. 3 also illustrates this data. The data shows that for all formulations, high impact strength and ductile behavior is maintained out to 1500 hours of Xenon Arc exposure.

TABLE 4

| Example Number | Exposure Hours | Energy Value ($kJ/m^2$) |
|---|---|---|
| Example 1 | 0 | 68.61 |
| Example 1 | 166 | 77.6 |
| Example 1 | 405 | 71.87 |
| Example 1 | 600 | 70.42 |
| Example 1 | 800 | 64.32 |
| Example 1 | 990 | 62.81 |
| Example 1 | 1500 | 66.26 |
| Example 2 | 0 | 67.37 |
| Example 2 | 166 | 76.63 |
| Example 2 | 405 | 74.83 |
| Example 2 | 600 | 70.59 |
| Example 2 | 800 | 62.71 |
| Example 2 | 990 | 65.88 |
| Example 2 | 1500 | 67.18 |
| Example 3 | 0 | 69.96 |
| Example 3 | 166 | 79.07 |
| Example 3 | 405 | 77.57 |
| Example 3 | 600 | 73.63 |
| Example 3 | 800 | 63.43 |
| Example 3 | 990 | 68.35 |
| Example 3 | 1500 | 69.86 |
| Example 4 | 0 | 69.24 |
| Example 4 | 166 | 78.6 |
| Example 4 | 405 | 76.22 |
| Example 4 | 600 | 76.82 |
| Example 4 | 800 | 67.61 |
| Example 4 | 990 | 67.7 |
| Example 4 | 1500 | 69.83 |
| Example 5 | 0 | 72.13 |
| Example 5 | 166 | 76.95 |
| Example 5 | 405 | 77.32 |
| Example 5 | 600 | 76 |
| Example 5 | 800 | 67.97 |
| Example 5 | 990 | 63.27 |
| Example 5 | 1500 | 71.54 |
| Example 6 | 0 | 72.5 |
| Example 6 | 166 | 75.65 |
| Example 6 | 405 | 76.9 |
| Example 6 | 600 | 75.76 |
| Example 6 | 800 | 68.18 |
| Example 6 | 990 | 66.87 |
| Example 6 | 1500 | 69.84 |
| Example 7 | 0 | 75.42 |
| Example 7 | 166 | 78.48 |
| Example 7 | 405 | 79.19 |
| Example 7 | 600 | 79.26 |
| Example 7 | 800 | 72.85 |
| Example 7 | 990 | 68.04 |
| Example 7 | 1500 | 74.32 |
| Example 8 | 0 | 73.31 |
| Example 8 | 166 | 76.19 |
| Example 8 | 405 | 77.36 |
| Example 8 | 600 | 77.44 |
| Example 8 | 800 | 70.9 |
| Example 8 | 990 | 67.34 |
| Example 8 | 1500 | 71.61 |

Examples 9-19—Property Testing for Formulations in Table 2

Figure 4:
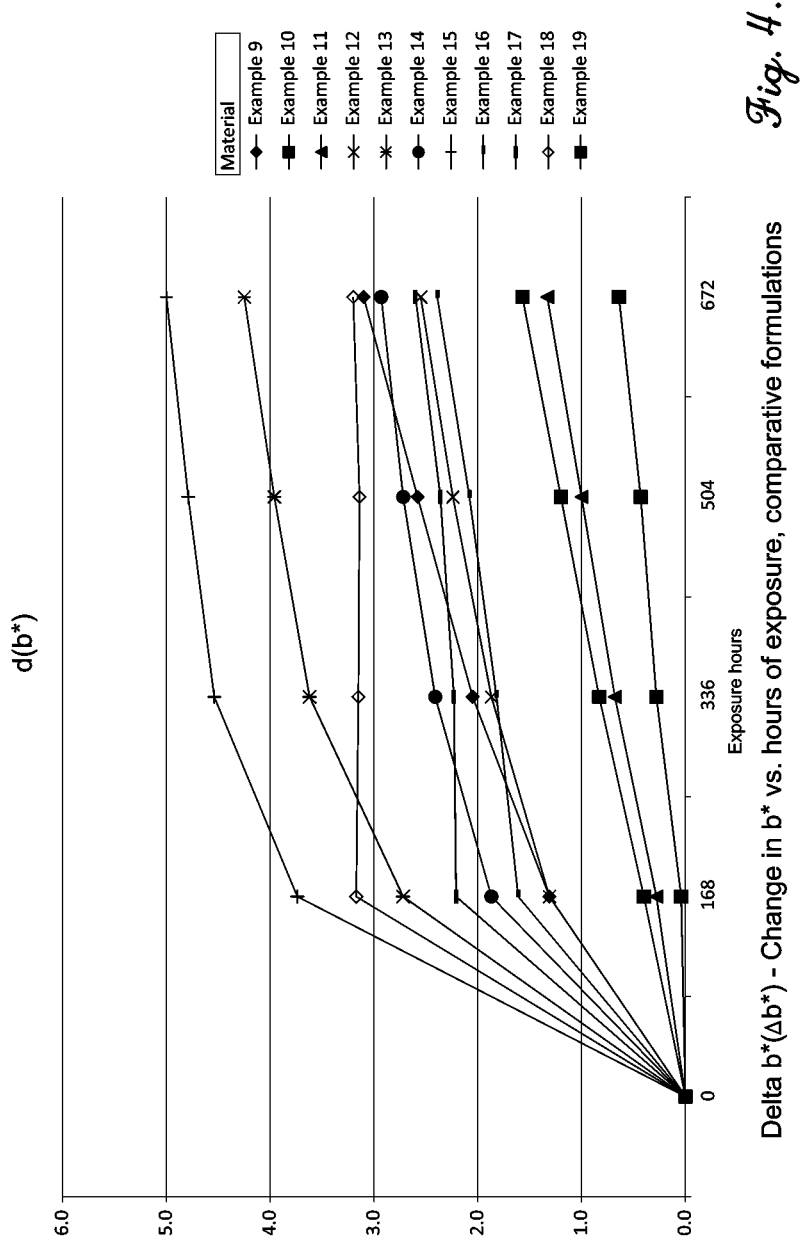
FIG. 4: The graph in FIG. 4 shows the effect on Δb*color at different levels of ultraviolet light stabilizer (for example, HALS/Triazine for Polyester 2 as described in Table 2 without primary antioxidant, secondary antioxidant, or chain extending agent.

Property Test 1—Change in b* (Δb*)—FIG. 4 shows Δb* (yellowness/blueness) as measured by ASTM D2244 for the formulations of Table 2 (Examples 9-19) with UV absorber for formulations containing individual UV absorbers and combinations of UV absorbers and HALS. The results show that all the samples increase in yellowness, some more rapidly than others depending on the amounts of UV absorber and UV absorber/HALS combinations. This indicates that the all the samples of Examples 9-19 of Table 2 are undergoing degradation due to UV radiation and much more rapidly than the formulations of Example 1-8 of Table 1 containing UV absorber, primary and secondary anti-oxidants, HALS and Nor-HALs and chain extender as shown by the data in Tables 3 and 5, and FIGS. 1 and 4.

Figure 5:
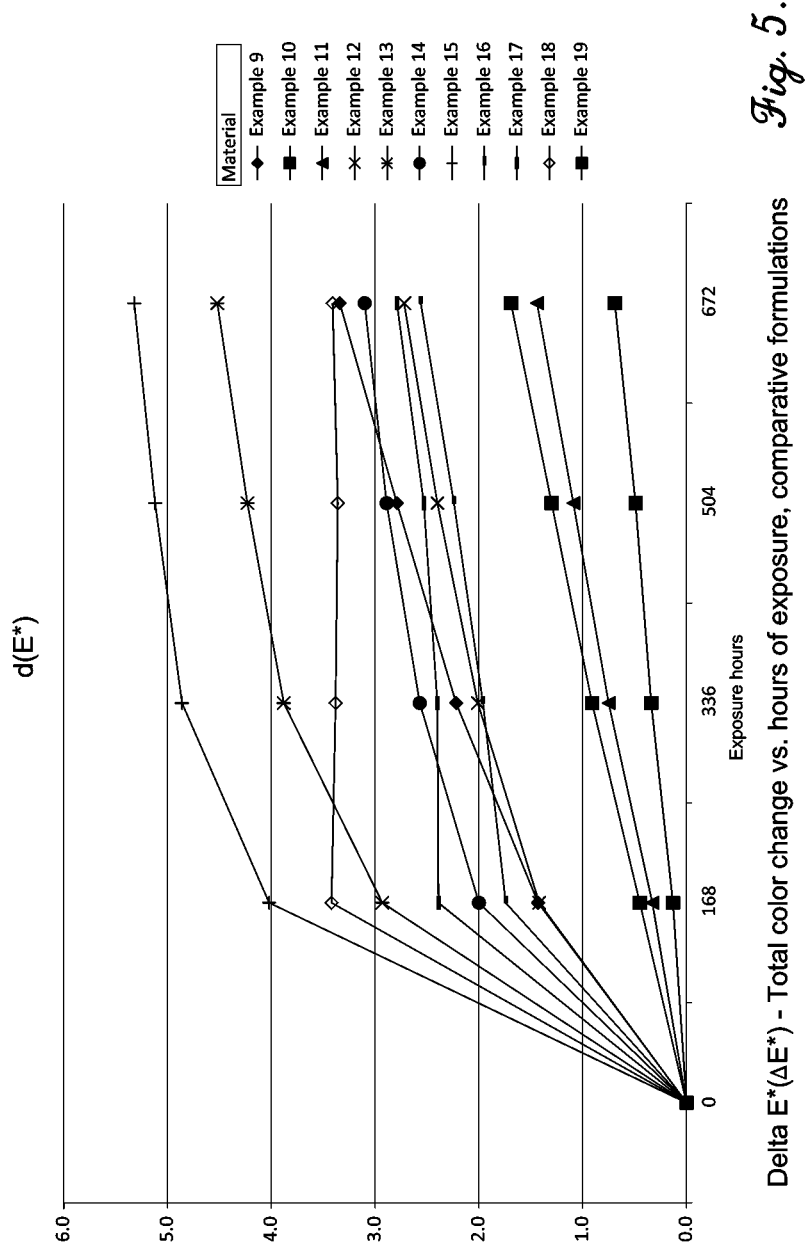
FIG. 5: The graph in FIG. 5 shows the effect on ΔE* value at different levels of ultraviolet light stabilizer (for example, HALS/Triazine for Polyester 2 as described in Table 2 without primary antioxidant, secondary antioxidant, or chain extending agent.

Property Test 2—Total Color Change (ΔE*)—Table 5 shows total color change, ΔE*, as measured by ASTM D2244 for the formulations of Table 2 (Examples 9-19) containing individual UV absorbers and combinations of UV absorbers and HALS. The data is also represented in FIG. 5. The results show that all the samples of Examples 9-19, Table 2 exhibit increases in total color change, some more rapidly than others depending on the amounts of UV absorber and UV absorber/HALS combinations. This indicates that Examples 9-19 of Table 2 are undergoing degradation due to UV radiation and much more rapidly than Examples 1-8 of Table 1 containing UV absorber, primary and secondary anti-oxidants, HALS and Nor-HALs and chain extender as shown by the data in Tables 3 and 5, and in FIGS. 2 and 5.

TABLE 5

| Example Number | Exposure hours | Δb*Value | ΔE*Value |
|---|---|---|---|
| Example 9 | 0 | 0 | 0 |
| Example 9 | 168 | 1.31 | 1.43 |
| Example 9 | 336 | 2.05 | 2.22 |
| Example 9 | 504 | 2.58 | 2.79 |
| Example 9 | 672 | 3.1 | 3.34 |
| Example 10 | 0 | 0 | 0 |
| Example 10 | 168 | 0.4 | 0.45 |
| Example 10 | 336 | 0.83 | 0.91 |
| Example 10 | 504 | 1.2 | 1.3 |
| Example 10 | 672 | 1.57 | 1.69 |
| Example 11 | 0 | 0 | 0 |
| Example 11 | 168 | 0.28 | 0.33 |
| Example 11 | 336 | 0.68 | 0.75 |
| Example 11 | 504 | 1 | 1.09 |
| Example 11 | 672 | 1.33 | 1.44 |
| Example 12 | 0 | 0 | 0 |
| Example 12 | 168 | 1.31 | 1.42 |
| Example 12 | 336 | 1.87 | 2.01 |
| Example 12 | 504 | 2.24 | 2.4 |
| Example 12 | 672 | 2.55 | 2.72 |
| Example 13 | 0 | 0 | 0 |
| Example 13 | 168 | 2.72 | 2.93 |
| Example 13 | 336 | 3.62 | 3.88 |
| Example 13 | 504 | 3.96 | 4.23 |
| Example 13 | 672 | 4.25 | 4.52 |
| Example 14 | 0 | 0 | 0 |
| Example 14 | 168 | 1.87 | 2 |
| Example 14 | 336 | 2.41 | 2.57 |
| Example 14 | 504 | 2.72 | 2.89 |
| Example 14 | 672 | 2.93 | 3.1 |
| Example 15 | 0 | 0 | 0 |
| Example 15 | 168 | 3.74 | 4.02 |
| Example 15 | 336 | 4.54 | 4.86 |
| Example 15 | 504 | 4.79 | 5.12 |
| Example 15 | 672 | 5 | 5.32 |
| Example 16 | 0 | 0 | 0 |
| Example 16 | 168 | 1.61 | 1.74 |
| Example 16 | 336 | 1.82 | 1.96 |
| Example 16 | 504 | 2.08 | 2.24 |
| Example 16 | 672 | 2.39 | 2.56 |
| Example 17 | 0 | 0 | 0 |
| Example 17 | 168 | 2.21 | 2.39 |
| Example 17 | 336 | 2.23 | 2.4 |
| Example 17 | 504 | 2.36 | 2.53 |
| Example 17 | 672 | 2.6 | 2.79 |
| Example 18 | 0 | 0 | 0 |
| Example 18 | 168 | 3.17 | 3.42 |
| Example 18 | 336 | 3.15 | 3.38 |
| Example 18 | 504 | 3.14 | 3.36 |
| Example 18 | 672 | 3.2 | 3.41 |
| Example 19 | 0 | 0 | 0 |
| Example 19 | 168 | 0.04 | 0.13 |
| Example 19 | 336 | 0.28 | 0.34 |
| Example 19 | 504 | 0.43 | 0.49 |
| Example 19 | 672 | 0.64 | 0.69 |

Figure 6:
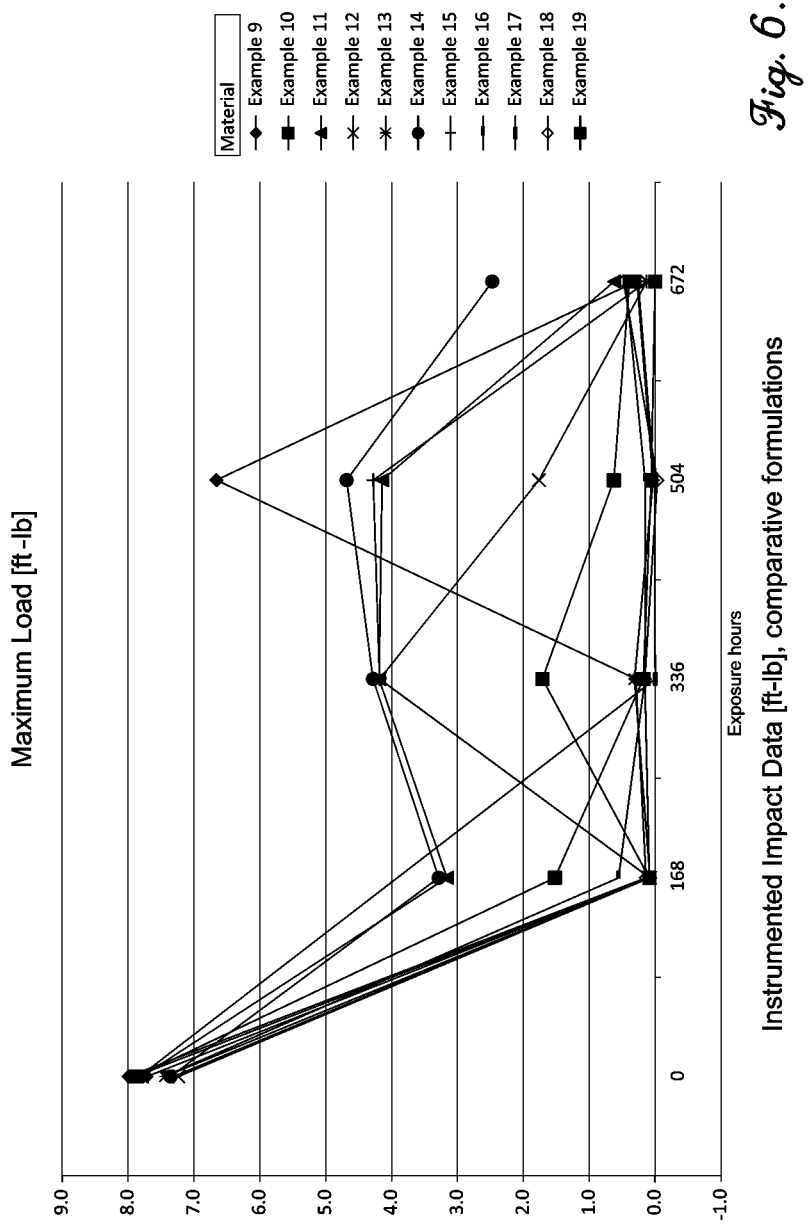
FIG. 6: The graph in FIG. 6 shows the flatwise impact strength at different levels of ultraviolet light stabilizer (for example, HALS/Triazine for Polyester 2 as described in Table 2 without primary antioxidant, secondary antioxidant, or chain extending agent.

Property Test 3—Instrumented Impact (ft-lb)—Table 6 shows instrumented impact values as measured in ft-lb units at 23° C. by ASTM D3763 for the formulations of Table 2 (Examples 9-19) with UV absorber for formulations containing individual UV absorbers and combinations of UV absorbers and HALS. FIG. 6 also illustrates this data. The results show rapid decreases in impact strength for all formulations of Table 2 until at about 672 hours where all the samples have become brittle and have lost impact resistance. This is indicative of rapid degradation of the polymer due to exposure to UV radiation in the Xenon Arc. In contrast, the data in FIG. 3 and in Table 4 shows retention of flatwise impact strength for the formulations of Examples 1-8 of Table 1 which contain additive combinations that synergistically improve the weathering resistance.

TABLE 6

| Example Number | Exposure [hours] | ft-lb at 23° C. |
|---|---|---|
| Example 9 | 0 | 8.393888 |
| Example 9 | 0 | 7.862816 |
| Example 9 | 0 | 7.730048 |
| Example 9 | 168 | 0.154896 |
| Example 9 | 168 | 0.118016 |
| Example 9 | 504 | 6.660528 |
| Example 9 | 672 | 0.678592 |
| Example 9 | 672 | 0.1844 |
| Example 9 | 672 | 0.007376 |
| Example 9 | 336 | 0.25816 |
| Example 9 | 336 | 0.324544 |
| Example 10 | 0 | 7.958704 |
| Example 10 | 0 | 7.7448 |
| Example 10 | 0 | 7.884944 |
| Example 10 | 168 | 0.088512 |
| Example 10 | 168 | 0.059008 |
| Example 10 | 168 | 4.410848 |
| Example 10 | 504 | 0.051632 |
| Example 10 | 504 | 0.059008 |
| Example 10 | 504 | 0.066384 |
| Example 10 | 672 | 0 |
| Example 10 | 672 | 0 |
| Example 10 | 336 | 0.07376 |
| Example 10 | 336 | 0.280288 |
| Example 11 | 0 | 7.96608 |
| Example 11 | 0 | 8.069344 |
| Example 11 | 0 | 7.331744 |
| Example 11 | 168 | 4.617376 |
| Example 11 | 168 | 4.7944 |
| Example 11 | 168 | 0.07376 |
| Example 11 | 504 | 6.284352 |
| Example 11 | 504 | 2.006272 |
| Example 11 | 672 | 0.612208 |
| Example 11 | 672 | 0.081136 |
| Example 11 | 672 | 1.165408 |
| Example 11 | 336 | 4.182192 |
| Example 11 | 336 | 4.196944 |
| Example 12 | 0 | 7.427632 |
| Example 12 | 0 | 8.061968 |
| Example 12 | 0 | 6.225344 |
| Example 12 | 168 | 0.07376 |
| Example 12 | 168 | 0.07376 |
| Example 12 | 168 | 0.103264 |
| Example 12 | 504 | 3.481472 |
| Example 12 | 504 | 0.044256 |
| Example 12 | 672 | 0.1844 |
| Example 12 | 672 | 0.066384 |
| Example 12 | 336 | 4.211696 |

TABLE 6-continued

| Example Number | Exposure [hours] | ft-lb at 23° C. |
|---|---|---|
| Example 12 | 336 | 4.145312 |
| Example 13 | 0 | 6.962944 |
| Example 13 | 0 | 7.457136 |
| Example 13 | 0 | 7.907072 |
| Example 13 | 168 | 0.07376 |
| Example 13 | 168 | 0.081136 |
| Example 13 | 504 | −0.007376 |
| Example 13 | 504 | 0.051632 |
| Example 13 | 504 | 0.044256 |
| Example 13 | 672 | 0.272912 |
| Example 13 | 336 | 0.567952 |
| Example 13 | 336 | 0.236032 |
| Example 13 | 336 | 0.132768 |
| Example 14 | 0 | 7.383376 |
| Example 14 | 0 | 6.660528 |
| Example 14 | 0 | 8.025088 |
| Example 14 | 168 | 0.088512 |
| Example 14 | 168 | 4.75752 |
| Example 14 | 168 | 5.008304 |
| Example 14 | 504 | 4.491984 |
| Example 14 | 504 | 4.964048 |
| Example 14 | 504 | 4.587872 |
| Example 14 | 672 | 0.088512 |
| Example 14 | 672 | 3.717504 |
| Example 14 | 672 | 3.606864 |
| Example 14 | 336 | 3.98304 |
| Example 14 | 336 | 4.580496 |
| Example 15 | 0 | 7.33912 |
| Example 15 | 0 | 7.287488 |
| Example 15 | 0 | 7.294864 |
| Example 15 | 168 | 0.07376 |
| Example 15 | 168 | 0.081136 |
| Example 15 | 168 | 0.081136 |
| Example 15 | 504 | 4.042048 |
| Example 15 | 504 | 3.673248 |
| Example 15 | 504 | 5.118944 |
| Example 15 | 672 | 0.088512 |
| Example 15 | 672 | 0.07376 |
| Example 15 | 672 | 0.22128 |
| Example 15 | 336 | 4.300208 |
| Example 15 | 336 | 4.16744 |
| Example 15 | 336 | 4.078928 |
| Example 16 | 0 | 7.390752 |
| Example 16 | 0 | 7.257984 |
| Example 16 | 0 | 7.715296 |
| Example 16 | 168 | 0.649088 |
| Example 16 | 168 | 0.486816 |
| Example 16 | 168 | 0.523696 |
| Example 16 | 504 | 0.250784 |
| Example 16 | 504 | 0.051632 |
| Example 16 | 672 | 0.892496 |
| Example 16 | 672 | 0 |
| Example 16 | 336 | 0.339296 |
| Example 16 | 336 | 0.059008 |
| Example 16 | 336 | 0.059008 |
| Example 17 | 0 | 7.663664 |
| Example 17 | 0 | 7.516144 |
| Example 17 | 0 | 8.298 |
| Example 17 | 504 | 0.007376 |
| Example 17 | 504 | 0.007376 |
| Example 17 | 672 | 0.472064 |
| Example 17 | 672 | 0.044256 |
| Example 17 | 336 | −0.014752 |
| Example 17 | 336 | 0 |
| Example 17 | 336 | 0.007376 |
| Example 18 | 0 | 7.471888 |
| Example 18 | 0 | 7.206352 |
| Example 18 | 0 | 8.460272 |
| Example 18 | 168 | 0.088512 |
| Example 18 | 504 | 0.007376 |
| Example 18 | 504 | −0.169648 |
| Example 18 | 504 | 0.059008 |
| Example 18 | 672 | 0.538448 |
| Example 18 | 672 | 0.486816 |
| Example 18 | 672 | 0.413056 |
| Example 18 | 336 | 0.154896 |
| Example 19 | 0 | 8.135728 |
| Example 19 | 0 | 7.89232 |
| Example 19 | 0 | 7.656288 |
| Example 19 | 168 | 0.103264 |
| Example 19 | 168 | 0.081136 |
| Example 19 | 168 | 0.081136 |
| Example 19 | 504 | 0.99576 |
| Example 19 | 504 | 0.826112 |
| Example 19 | 504 | 0.059008 |
| Example 19 | 672 | 0.066384 |
| Example 19 | 672 | 0.708096 |
| Example 19 | 336 | 4.292832 |
| Example 19 | 336 | 0.11064 |
| Example 19 | 336 | 0.730224 |

It can be clearly seen from a comparison of the data in the above relevant working examples that a combination of primary antioxidant, secondary antioxidant, chain extending agent and ultraviolet light stabilizers useful in the invention can improve weathering properties, impact strength properties and/or color of certain polymer compositions The invention has been described in detail with reference to the embodiments described herein, but it will be understood that variations and modifications can be effected within the scope of the invention.

I claim:

1. A polymer composition comprising:
   (A) at least one polyester that comprises:
      diacid residues comprising 70 to 100 mole % terephthalic acid residues and 0 to 30 mole % isophthalic acid residues, and
      diol residues comprising from 20 to 40 mole % of 2,2,4,4-tetramethyl-1,3-cyclobutanediol residues and from 60 to 80 mole % of 1,4-cyclohexanedimethanol residues,
      wherein the total mole % of diol residues equals 100 weight % and the total mole % of diacid residues equals 100 mole %, and
      wherein the at least one polyester has a glass transition temperature (Tg) in a range from 100 to 130° C., as measured by ASTM Method 3418; and
   (B) a stabilizer composition comprising:
      (1) at least one primary antioxidant comprising at least one hindered phenolic antioxidant;
      (2) at least one secondary antioxidant comprising at least one phosphite;
      (3) at least one chain extending agent;
      (4) at least one triazine ultraviolet light absorbing agent; and
      (5) at least one hindered amine light stabilizer,
      wherein the at least one triazine ultraviolet light absorber is present in an amount from 1.5 to 3.0 weight %, based on the total weight of the polymer composition.

2. The polymer composition of claim 1 wherein the at least one phenolic antioxidant is present in an amount from 0.10 to 2.0 weight %, based on the total weight of the polymer composition equaling 100 weight %.

3. The polymer composition of claim 1 wherein the at least one phosphite antioxidant is present in an amount from 0.10 weight % to 2.0 weight %, based on the total weight of the polymer composition.

4. The polymer composition of claim 1 wherein the weight ratio of the at least one phenolic antioxidant (1) to the at least one phosphite antioxidant (2) is from 0.25-2.0.

5. The polymer composition of claim 1 wherein said at least one chain extending agent is present in an amount from 0.10 weight % to 2.0 weight %, based on the total weight of the polymer composition equaling 100 weight %.

6. The polymer composition of claim 1 wherein said at least one chain extending agent comprises at least one of copolymers of glycidyl methacrylate with alkenes and acrylic esters, copolymers of glycidyl methacrylate with alkenes and vinyl acetate, copolymers of glycidyl methacrylate and styrene.

7. The polymer composition of claim 1 wherein the weight ratio of the at least one chain extending agent to the at least one primary antioxidant is from 2:1.

8. The polymer composition of claim 1 wherein the weight ratio of the at least one chain extending agent to total primary and secondary antioxidant is from 0.50-2.0.

9. The polymer composition of claim 1, wherein the total weight ratio of the at least one ultraviolet light absorbing agent to the total weight of primary and secondary antioxidant is from 10:0.25; and wherein the total weight ratio of the at least one ultraviolet light absorbing agent to the at least one chain extender is from 10:0.25.

10. The polymer composition of claim 1 wherein the at least one hindered amine light stabilizer has the following structure:

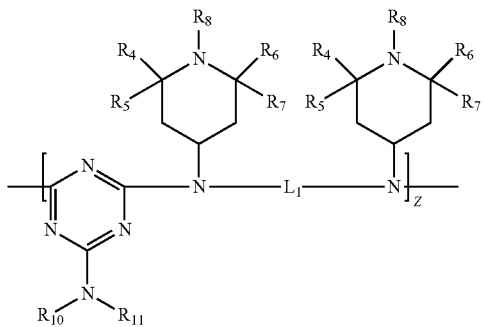

wherein $R_4=R_5=R_6=R_7=R_8$=methyl, $(R_{10})$ $(R_{11})$N-collectively represent morpholino, $L_1$ is hexamethylene, and Z is 1 to 6.

11. The polymer composition of claim 1 wherein said at least one hindered amine light stabilizer is present in an amount from 0.10 weight % to 2.0 weight %, based on the total weight of the polymer composition.

12. The polymer composition of claim 1, wherein the weight ratio of the at least one ultraviolet light absorbing agent to the at least one hindered amine light stabilizer is from 10:0.25.

13. The polymer composition of claim 1, wherein: (1) the at least one phenolic antioxidant is pentaerythritol tetrakis [3-(3,5-di-t-butyl-4-hydroxyphenyl) propionate; (2) the at least one phosphite is tris (2,4-di-tert-butylphenyl) phosphite; (3) the at least one chain extending agent is a copolymer of glycidyl methacrylate with styrene; (4) the at least one ultraviolet light absorbing agent is selected from at least one of 2,4-cis (2,4-dimethylphenyl)-6-(2-hydroxy-4-isooctyloxyphenyl)-1,3,5-triazine(CAS #2725-22-62); 2,4, 6-diphenyl-1,3,5-triazin-2-yl)-5-[(hexyl) oxy]-phenol] (CAS #147315-50-2); 6-[4,6-bis(4-phenylphenyl)-1H-1,3, 5-triazin-2-ylidene]-3-(2-ethylhexoxy) cyclohexa-2,4-dien-1-one)(CAS #204583-39-1), or mixtures thereof; and (5) the at least one hindered amine light stabilizer is selected from 1,6-hexanediamine N, N-bis(2,2,6,6-tetramethyl-4-piperidinyl)(CAS #565450-39-7) or from polymers with morpholine-2,4,6-trichloro1,3,5-triazine(CAS #193098-40-7) or mixtures thereof.

14. The polymer composition of claim 13 wherein the polymer composition comprises: (1) at least one phenolic antioxidant in the amount of from 0.10 weight % to 2.0 weight %; (2) at least one phosphite in the amount of from 0.10 weight % to 2.0 weight %; (3) at least one chain extending agent in the amount of from 0.10 weight % to 2.0 weight; (4) at least one ultraviolet light absorber in the amount of 1.5 to 3.0 weight %; and (5) at least one hindered amine light stabilizer in an amount from 0.10 weight % to 2.0 weight %, based on the total weight of the polymer composition; based on the total weight of the polymer composition equaling 100 weight %.

15. The polymer composition of claim 1 wherein the polyester comprises: diacid residues comprising 70 to 100 mole % terephthalic acid residues and 0 to 30 mole % isophthalic acid residues, wherein the total mole % of diol residues equals 100 weight % and the total mole % of diacid residues equals 100 mole %; and
  wherein the diol residues comprise from 20 to 30 mole % 2,2,4,4-tetramethyl-1,3-cyclobutanediol residues, and from 70 to 80 mole % of 1,4-cyclohexanedimethanol residues.

16. The polymer composition of claim 1 wherein the polyester has an inherent viscosity in the range from 0.35 to 1.5 dL/g, as determined in 60/40 (wt/wt) phenol/tetrachloroethane at a concentration of 0.5 g/100 ml at 25° C.

17. The polymer composition of claim 15, wherein the polyester composition comprises: diacid residues comprising 99 to 100 mole % terephthalic acid residues and diol residues comprising from 20 to 30 mole % 2,2,4,4-tetramethyl-1,3-cyclobutanediol residues and from 70 to 80 mole % of 1,4-cyclohexanedimethanol residues, and
  wherein the total mole % of diol residues equals 100 weight % and the total mole % of diacid residues equals 100 mole %.

18. The polymer composition of claim 14, wherein the at least one ultraviolet light absorbing agent is 6-[4,6-bis(4-phenylphenyl)-1H-1,3,5-triazin-2-ylidene]-3-(2-ethylhexoxy)cyclohexa-2,4-dien-1-one)(CAS #204583-39-1).

19. The polymer composition of claim 1 wherein the Δb* value for said polymer composition is less than 10 according to the L*, a* and b* color system of the CIE (International Commission on Illumination), when exposed according to ASTM Test Method G155 in a xenon arc Atlas Ci4000 Weather-Ometer using an irradiation of 0.35 W/m² at 340 nm, inner and outer borosilicate filters, 55% relative humidity, a black panel temperature of 63° C., a chamber temperature of 52° C., and a cycle consisting of all light with 18 minutes of water spray for every 2 hours irradiation; or
  wherein the ΔE* value for said polymer composition is less than 10 according to the L*, a* and b* color system of the CIE (International Commission on Illumination) after being exposed for at least 600 hours; or
  wherein the flatwise impact strength according to ASTM Method D6395 was 60 to 80 KJ/m² when exposed from 0 to 1600 hours.

* * * * *